(12) United States Patent
Oh et al.

(10) Patent No.: US 8,057,700 B2
(45) Date of Patent: Nov. 15, 2011

(54) LIQUID CRYSTAL PHOTO-ALIGNMENT AGENT AND LIQUID CRYSTAL PHOTO-ALIGNMENT FILM AND LIQUID CRYSTAL DISPLAY INCLUDING THE SAME

(75) Inventors: Jae-Min Oh, Uiwang-si (KR); Dong-Seon Uh, Uiwang-si (KR); Jae-Deuk Yang, Uiwang-si (KR); Tae-Hyoung Kwak, Uiwang-si (KR)

(73) Assignee: Cheil Industries, Inc., Gumi-si (KR)

( * ) Notice: Subject to any disclaimer, the term of this patent is extended or adjusted under 35 U.S.C. 154(b) by 173 days.

(21) Appl. No.: 12/329,139

(22) Filed: Dec. 5, 2008

(65) Prior Publication Data

US 2009/0146105 A1    Jun. 11, 2009

(30) Foreign Application Priority Data

Dec. 7, 2007 (KR) .................. 10-2007-0127124

(51) Int. Cl.
*C09K 19/56* (2006.01)
*G02F 1/1337* (2006.01)
(52) U.S. Cl. .................. 252/299.4; 428/1.2; 428/1.25; 428/1.26; 349/123
(58) Field of Classification Search .................. 428/1.1, 428/1.2, 1.25, 1.26; 252/299.4; 349/127, 349/123
See application file for complete search history.

(56) References Cited

U.S. PATENT DOCUMENTS

| 6,307,002 | B1 | 10/2001 | Okada et al. |
| 2007/0036915 | A1 | 2/2007 | Kurosaki et al. |
| 2007/0093640 | A1 | 4/2007 | Kim et al. |
| 2007/0128378 | A1 | 6/2007 | Kim et al. |

FOREIGN PATENT DOCUMENTS

| JP | 59-145216 | 8/1984 |
| JP | 61-059334 | 3/1986 |
| JP | 08-208983 | 8/1996 |
| JP | 09-080440 | 3/1997 |
| JP | 2005-037920 | 2/2005 |
| KR | 10-1998-0059346 | 10/1998 |
| KR | 100213178 B1 | 5/1999 |
| KR | 1020000035320 A | 6/2000 |
| KR | 1020020068695 A | 8/2002 |
| KR | 1020040083610 A | 10/2004 |
| KR | 1020050065051 A | 6/2005 |
| KR | 10-2005-0106423 A | 11/2005 |
| KR | 1020070057658 A | 6/2007 |

Primary Examiner — Shean Wu
(74) Attorney, Agent, or Firm — Summa, Addition & Ashe, P.A.

(57) ABSTRACT

One embodiment of the present invention provides a liquid crystal photo-alignment agent that includes a polyamic acid copolymer including a repeating unit having the following Formula 1 and a repeating unit having the following Formula 2; a polyimide copolymer including a repeating unit having the following Formula 3 and a repeating unit having the following Formula 4; or a combination thereof:

[Chemical Formula 1]

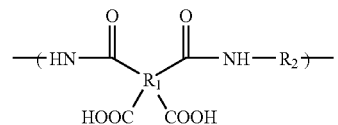

[Chemical Formula 2]

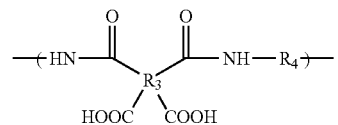

[Chemical Formula 3]

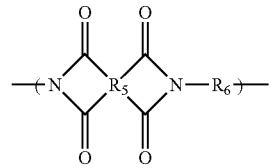

[Chemical Formula 4]

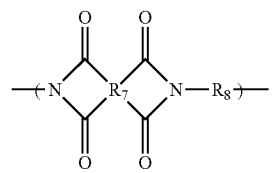

wherein the definition of R1 to R8 are the same as in the specification. The liquid crystal photo-alignment agent can have improved liquid crystal alignment properties, electrical characteristics such as voltage holding ratio, pretilt angle, residual DC, and the like, printability, cleaning stability, and spot stability, and is capable of unidirectionally aligning liquid crystals by ultraviolet (UV) exposure.

23 Claims, 1 Drawing Sheet

LIQUID CRYSTAL PHOTO-ALIGNMENT AGENT AND LIQUID CRYSTAL PHOTO-ALIGNMENT FILM AND LIQUID CRYSTAL DISPLAY INCLUDING THE SAME

CROSS-REFERENCE TO RELATED APPLICATION

This application claims priority to and the benefit of Korean Patent Application No. 10-2007-0127124 filed in the Korean Intellectual Property Office on Dec. 7, 2007, the entire disclosure of which is incorporated herein by reference.

FIELD OF THE INVENTION

The present invention relates to a liquid crystal photo-alignment agent for a liquid crystal display (LCD), and a liquid crystal photo-alignment film and an LCD including the same.

BACKGROUND OF THE INVENTION

A liquid crystal display (LCD) includes a liquid crystal alignment film. The liquid crystal alignment film is primarily made of polymer materials. The liquid crystal alignment film directs the alignment of liquid crystal molecules. When the liquid crystal molecules are moved by the influence of an electric field to display an image, the liquid crystal alignment film allows the liquid crystal molecules to be oriented in a predetermined direction. Generally, it is necessary to uniformly align the liquid crystal molecules in order to provide uniform luminance and a high contrast ratio to the liquid crystal device.

The conventional method of aligning the liquid crystal molecules includes coating a polymer film such as a polyimide on a substrate made of a material such as glass, and rubbing the surface of the substrate with a fiber such as nylon or polyester in a certain direction. However, the rubbing method may cause serious problems when fabricating a liquid crystal panel due to fine dust or electrostatic discharge (ESD) that may be generated while rubbing the polymer film with the fiber.

Significant research has focused on overcoming the problems associated with the rubbing method and to improve the viewing angle. For this purpose, vertical liquid crystal alignment has been developed. However, vertical alignment also has problems in that manufacturing processes are needed and luminance is reduced since a photolithography process is required on a color filter glass in order to obtain a wide viewing angle.

In order to solve the problems of the rubbing method, a photo-radiation method has recently been proposed to induce anisotropy to the polymer film by irradiating light on the film so as to align the liquid crystal molecules.

Polymers having photo-functional groups such as azobenzene, coumarin, chalcone, and cinnamate have been suggested as polymer film materials for photo-alignment methods. Such polymers are anisotropically photo-isomerized or photo-cross-linked by irradiation with polarized light, so as to provide anisotropy to the surface so that the polymer film can induce alignment of the liquid crystal molecules in a certain direction.

The material for the liquid crystal alignment film should have optical stability and thermal stability, as well as no after-image in order for it to be useful in a large liquid crystal display device (LCD). However, conventional photo-alignment materials have many troubles in this respect.

Further, conventional materials for the liquid crystal photo-alignment film are primarily polymeric with a main polymer chain and a side group with a photo-functional group that is capable of inducing photo-anisotropy, such as azobenzene or cinnamate. When such a material is used for a polymeric liquid crystal photo-alignment film, however, problems may result. For example, a significant amount of photo energy is required to induce the anisotropy. Also, a plurality of unreacted photo-functional groups can remain, which can negatively affect thermal stability, optical stability, and electro-optical characteristics.

In general, a liquid crystal display is fabricated by coating a liquid crystal photo-alignment agent on a glass substrate deposited with a transparent indium tin oxide (ITO) conductive layer and heating it to form a liquid crystal alignment film. Two substrates oppositely facing each other are then combined, and the liquid crystals implanted therebetween. Alternatively, a liquid crystal display can be fabricated by dripping liquid crystals on one substrate and combining the substrate with another oppositely facing substrate. Later generations of liquid crystal displays ($5^{th}$ generation or later) of medium- and large-sized product lines are typically manufactured using the latter method.

In general, a liquid crystal photo-alignment film is formed by coating a liquid crystal photo-alignment agent prepared by dissolving polyamic acid or polyimide in an organic solvent on a substrate in a flexo printing method, and then predrying and firing it. When the liquid crystal photo-alignment agent has bad printability, it may have a film thickness deviation, and thereby may have a negative influence on display characteristics of a liquid crystal display including the film.

In order to solve this problem, Japanese Patent Laid-Open Publication Pyong 8-208983 discloses a liquid crystal photo-alignment agent prepared by dissolving diethylene glycol diethylether in a solvent with excellent dissolvability against polyamic acid or polyimide. In addition, Korean Patent Laid-Open Publication No. 2005-0106423 discloses a liquid crystal photo-alignment agent with excellent printability, which is prepared by using diethylene glycol diethylether and dipropylene glycol monomethylether as a solvent.

Accordingly, a liquid crystal photo-alignment agent prepared by using the solvents has improved printability since it is rapidly spread out on a substrate. These methods, however, can cause aggregations at the ends of the substrate after printing, and thereby, the methods can fail to form a uniform film.

SUMMARY OF THE INVENTION

An exemplary embodiment of the present invention provides a vertical alignment liquid crystal photo-alignment agent having a wide viewing angle without reduced luminance, and that is made by a simple manufacturing process. Another embodiment of the present invention provides a liquid crystal photo-alignment agent having improved liquid crystal alignment properties, electrical characteristics such as voltage holding ratio, pretilt angle, residual DC, and the like, printability, cleaning stability, and spot stability, and is capable of unidirectionally aligning liquid crystals by ultraviolet (UV) exposure.

A further embodiment of the present invention provides a liquid crystal photo-alignment film prepared by the liquid crystal photo-alignment agent.

A further embodiment of the present invention provides a liquid crystal display (LCD) including the liquid crystal photo-alignment film.

The embodiments of the present invention are not limited to the above technical purposes, and a person of ordinary skill in the art can understand other technical purposes.

According to one embodiment of the present invention, a liquid crystal photo-alignment agent is provided that includes: a polyamic acid copolymer including a repeating unit having the following Formula 1 and a repeating unit having the following Formula 2, a polyimide copolymer including a repeating unit having the following Formula 3 and a repeating unit having the following Formula 4, or a combination thereof:

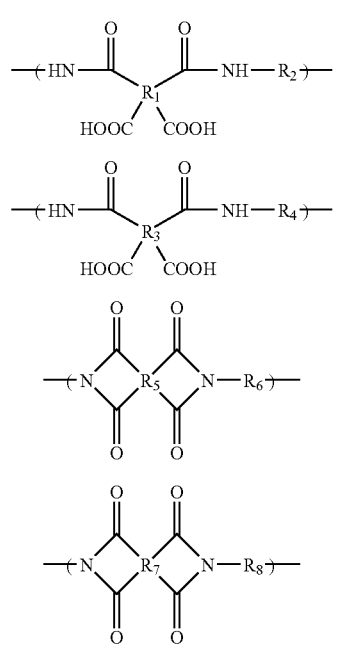

[Chemical Formula 1]

[Chemical Formula 2]

[Chemical Formula 3]

[Chemical Formula 4]

wherein, in the above Formulae 1 to 4, $R_1$, $R_3$, $R_5$, and $R_7$ are each independently a quadrivalent organic group derived from an acid dianhydride comprising an aliphatic cyclic acid dianhydride or an aromatic acid dianhydride, $R_2$ and $R_6$ are each independently a divalent organic group derived from an aromatic diamine, and $R_4$ and $R_8$ are each independently a divalent organic group derived from a photodiamine comprising a coumarin-based photodiamine, chalcone-based photodiamine, or cinnamate-based photodiamine.

Yet another embodiment of the present invention provides a liquid crystal photo-alignment film prepared by coating the liquid crystal photo-alignment agent on a substrate.

Still another embodiment of the present invention provides a liquid crystal display (LCD) including the liquid crystal photo-alignment film.

Hereinafter, other embodiments of the present invention will be described in detail.

The liquid crystal photo-alignment agent has improved liquid crystal alignment properties, electrical characteristics such as voltage holding ratio, pretilt angle, residual DC, and the like, printability, cleaning stability, and spot stability, and is capable of unidirectionally aligning liquid crystals by ultraviolet (UV) exposure.

DETAILED DESCRIPTION OF THE INVENTION

Figure 1:
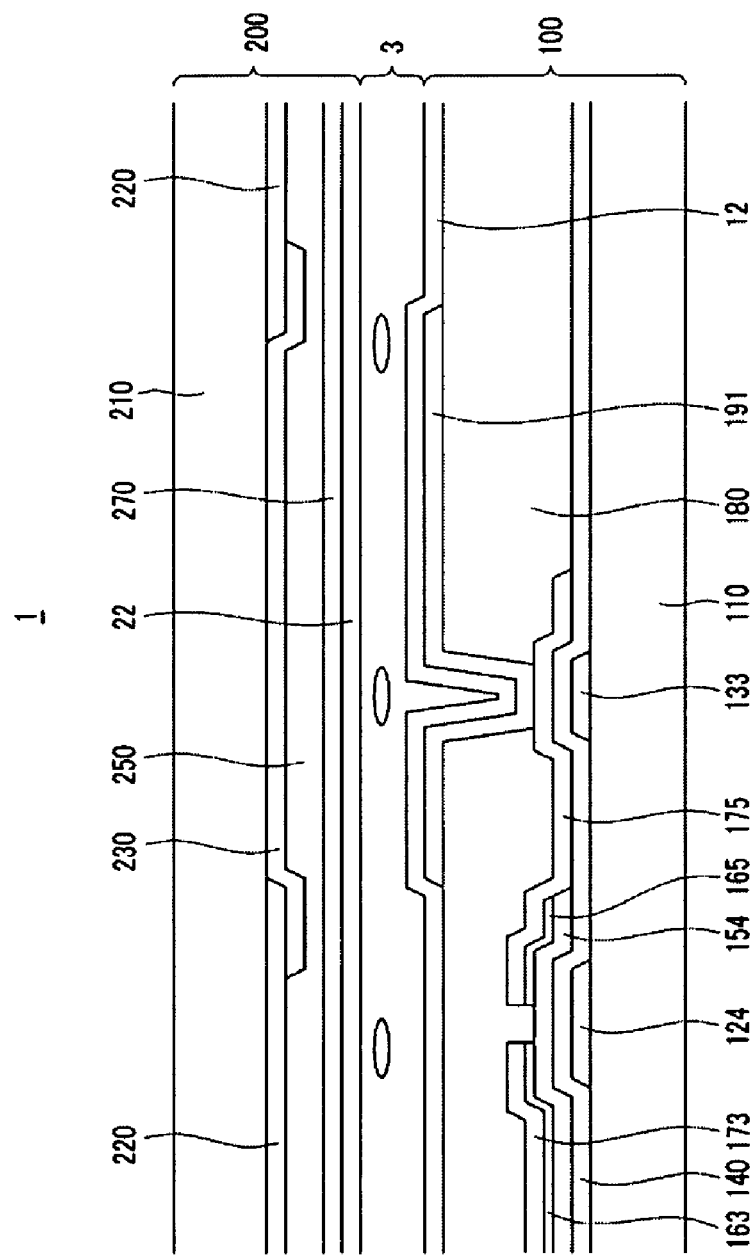
FIG. 1 is a cross-sectional view of a liquid crystal display (LCD) according to one embodiment of the present invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The liquid crystal photo-alignment agent according to one embodiment of the present invention includes a polyamic acid copolymer including a repeating unit having the following Formula 1 and a repeating unit having the following Formula 2, a polyimide copolymer including a repeating unit having the following Formula 3 and a repeating unit having the following Formula 4, or a combination thereof.

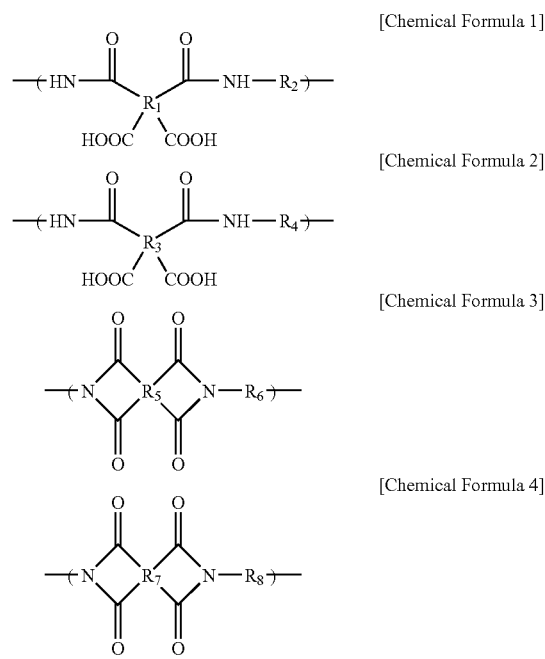

[Chemical Formula 1]

[Chemical Formula 2]

[Chemical Formula 3]

[Chemical Formula 4]

wherein, in the above Formulae 1 to 4, $R_1$, $R_3$, $R_5$, and $R_7$ are each independently a quadrivalent organic group derived from an acid dianhydride comprising an aliphatic cyclic acid dianhydride or an aromatic acid dianhydride, $R_2$ and $R_6$ are each independently divalent organic groups derived from an aromatic diamine, and $R_4$ and $R_8$ are each independently divalent organic groups derived from a photodiamine comprising a coumarin-based photodiamine, chalcone-based photodiamine, or cinnamate-based photodiamine.

The polyamic acid copolymer or polyimide copolymer includes a vertical alignment group and a photoreactive group providing alignment by photo-radiation.

As used herein, when a specific definition is not otherwise provided, the term "substituted" refers to one substituted with at least a substituent comprising halogen, C1 to C30 alkyl, C1 to C30 haloalkyl, C6 to C30 aryl, C2 to C30 heteroaryl, C1 to C20 alkoxy, or a combination thereof.

Also as used herein, when a specific definition is not otherwise provided, the term "hetero" refers to a compound including one to three hetero atoms comprising one or more of N, O, S, or P atoms and the remaining ring carbon atoms.

Conventionally, liquid crystal alignment has been induced through a rubbing process. However, this method generates static electricity and foreign particles, and rubbing tracks found on a final product. In order to address these problems, a new photo-alignment method has been suggested. The photo-alignment method, however, still is insufficient due to reliability deterioration due to low anchoring energy.

For example, a vertical alignment method is widely used to improve viewing angle. It does not need a rubbing process but needs patterning at a color filter glass through a photolithography process to secure a larger viewing angle, thereby deteriorating luminance.

According to one embodiment of the present invention, a liquid crystal photo-alignment agent includes a diamine monomer having a photo-reactive group with a photo-alignment property and a diamine monomer having a substituent for realizing vertical alignment.

The liquid crystal photo-alignment agent of the present invention can have vertical alignment and photo-alignment properties and electrical characteristics equivalent to or better than a conventional non-photo vertical alignment agent.

The repeating unit represented by the above Formula 1 is derived from polyamic acid which is synthesized through a reaction between at least one diamine comprising an aromatic diamine, a functional diamine, or a combination thereof and an acid dianhydride comprising an aliphatic cyclic acid dianhydride, an aromatic acid dianhydride, or a combination thereof.

The polyamic acid can be prepared using any conventional method known in the art for copolymerizating a polyamic acid without any particular limit.

Exemplary aliphatic cyclic acid dianhydrides suitable for use in the present invention include without limitation 1,2,3,4-cyclobutanetetracarboxylic acid dianhydride (CBDA), 5-(2,5-dioxotetrahydrofuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxyl-3-methylcarboxyl cyclopentane dianhydride, 1,2,3,4-tetracarboxyl cyclopentane dianhydride, and the like, and combinations thereof.

The quadrivalent organic group derived from the aliphatic cyclic acid dianhydride can have a structure represented by one or more of the following Formulae 5 to 9 or a combination thereof.

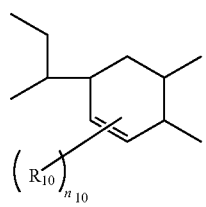
[Chemical Formula 5]

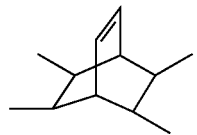
[Chemical Formula 6]

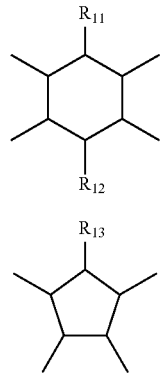
[Chemical Formula 7]

[Chemical Formula 8]

[Chemical Formula 9]

wherein, in the above Formulae 5 to 9,
$R_{10}$ is substituted or unsubstituted C1 to C20 alkyl, substituted or unsubstituted C6 to C30 aryl, or substituted or unsubstituted C2 to C30 heteroaryl, and $n_{10}$ is an integer ranging from 0 to 3, and
$R_{11}$ to $R_{17}$ are each independently hydrogen, substituted or unsubstituted C1 to C20 alkyl, substituted or unsubstituted C6 to C30 aryl, or substituted or unsubstituted C2 to C30 heteroaryl.

Exemplary aromatic acid dianhydrides suitable for use in the present invention include without limitation pyromellitic acid dianhydride (PMDA), biphthalic acid dianhydride (BPDA), oxydiphthalic acid dianhydride (ODPA), benzophenone tetracarboxylic acid dianhydride (BTDA), hexafluoroisopropylidene diphthalic acid dianhydride (6-FDA), and the like, and combinations thereof.

The quadrivalent organic group derived from the aromatic acid dianhydride can have a structure represented by one or more of the following Formulae 10 and 11 or a combination thereof.

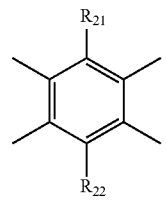
[Chemical Formula 10]

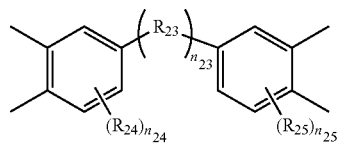
[Chemical Formula 11]

wherein, in the above Formulae 10 and 11, $R_{21}$ and $R_{22}$ are each independently hydrogen, substituted or unsubstituted C1 to C20 alkyl, substituted or unsubstituted C6 to C30 aryl, or substituted or unsubstituted C2 to C30 heteroaryl, $R_{24}$ and $R_{25}$ are each independently substituted or unsubstituted C1 to C20 alkyl, substituted or unsubstituted C6 to C30 aryl, or substituted or unsubstituted C2 to C30 heteroaryl, and $n_{24}$ and $n_{25}$ are each independently integers ranging from 0 to 3, and $R_{23}$ is O, CO, $C(CF_3)_2$, substituted or unsubstituted C1 to C6 alkylene, substituted or unsubstituted C3 to C30 cycloalkylene, or substituted or unsubstituted C2 to C30 heterocycloalkylene, and $n_{23}$ is an integer of 0 or 1.

Exemplary aromatic diamines suitable for use in the present invention include without limitation paraphenylene diamine (p-PDA), 4,4-methylene dianiline (MDA), 4,4-oxy-dianiline (ODA), metabisaminophenoxy diphenylsulfone (m-BAPS), parabisaminophenoxy diphenylsulfone (p-BAPS), 2,2-bis[(aminophenoxy)phenyl]propane (BAPP), 2,2-bisaminophenoxyphenylhexafluoropropane (HF-BAPP), 1,4-diamino-2-methoxybenzene, and the like, and combinations thereof.

The divalent organic group derived from the aromatic diamine can have a structure represented by one or more of the following Formulae 12 to 14 or a combination thereof.

[Chemical Formula 12]

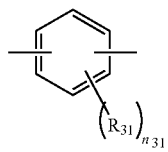

[Chemical Formula 13]

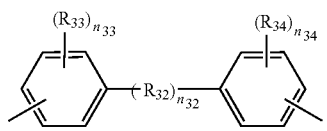

[Chemical Formula 14]

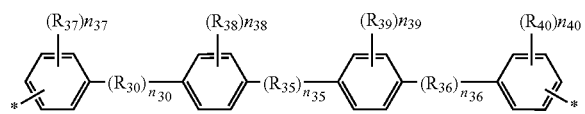

wherein, in the above Formulae 12 to 14, $R_{31}$, $R_{33}$, $R_{34}$, and $R_{37}$ to $R_{40}$ are each independently substituted or unsubstituted C1 to C20 alkyl, substituted or unsubstituted C6 to C30 aryl, substituted or unsubstituted C2 to C30 heteroaryl, wherein the substituents can further include —O—, —COO—, —CONH—, —OCO—, or a combination thereof (in addition to the substituents described herein, e.g., halogen, C1 to C30 alkyl, C1 to C30 haloalkyl, C6 to C30 aryl, C2 to C30 heteroaryl, C1 to C20 alkoxy, or a combination thereof), $R_{30}$, $R_{32}$, $R_{35}$, and $R_{36}$ are each independently O, $SO_2$, or $C(R')(R'')$ such as $C(CF_3)_2$ (wherein R' and R'' are each independently hydrogen or substituted or unsubstituted C1 to C6 alkyl), $n_{31}$, $n_{33}$, $n_{34}$, and $n_{37}$ to $n_{40}$ are each independently integers ranging from 0 to 4, and $n_{30}$, $n_{32}$, $n_{35}$, and $n_{36}$ are each independently integers of 0 or 1.

In addition, the repeating unit represented by the above Formula 1 may include a functional diamine represented by one or more of the following Formulae 15 to 18 or a combination thereof, so that a liquid crystal alignment film can have an easily-controlled pre-tilt angle of a liquid crystal molecule and excellent alignment characteristics. A part of the repeating unit represented by the above Formula 1 can include a divalent organic group derived from the functional diamine.

[Chemical Formula 15]

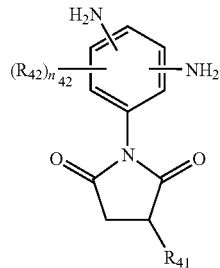

wherein, in the above Formula 15, $R_{41}$ is hydrogen, substituted or unsubstituted C1 to C20 alkyl, substituted or unsubstituted C6 to C30 aryl, or substituted or unsubstituted C2 to C30 heteroaryl, $R_{42}$ is substituted or unsubstituted C1 to C20 alkyl, substituted or unsubstituted C6 to C30 aryl, or substituted or unsubstituted C2 to C30 heteroaryl, and $n_{42}$ is an integer ranging from 0 to 3.

[Chemical Formula 16]

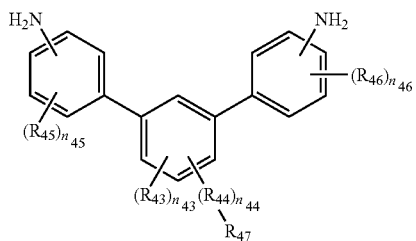

wherein, in the above Formula 16, $R_{43}$, $R_{45}$, and $R_{46}$ are each independently substituted or unsubstituted C1 to C20 alkyl, substituted or unsubstituted C6 to C30 aryl, or substituted or unsubstituted C2 to C30 heteroaryl, $R_{44}$ is —O—, —COO—, —CONH—, —OCO—, or substituted or unsubstituted C1 to C10 alkylene, $R_{47}$ is hydrogen; substituted or unsubstituted C1 to C20 alkyl; substituted or unsubstituted C6 to C30 aryl; substituted or unsubstituted C2 to C30 heteroaryl; or alkyl, aryl, or heteroaryl including —O—, —COO—, —CONH—, —OCO—, or a combination thereof, $n_{43}$ is an integer of 0 or 3, $n_{45}$ and $n_{46}$ are each independently integers ranging from 0 to 4, and $n_{44}$ is an integer of 0 or 1.

[Chemical Formula 17]

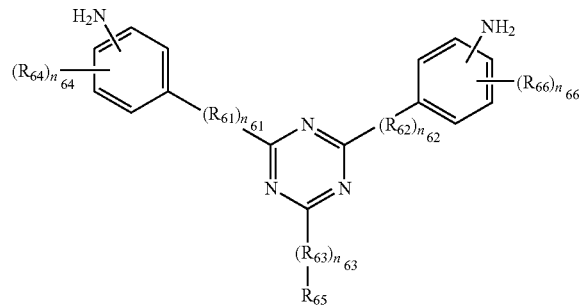

wherein, in the above Formula 17, $R_{64}$ and $R_{66}$ are each independently substituted or unsubstituted C1 to C20 alkyl, substituted or unsubstituted C6 to C30 aryl, or substituted or unsubstituted C2 to C30 heteroaryl, $R_{65}$ is hydrogen, substituted or unsubstituted C1 to C20 alkyl, substituted or unsubstituted C6 to C30 aryl, or substituted or unsubstituted C2 to C30 heteroaryl, $R_{61}$ and $R_{62}$ are each independently —O— or —COO—, $R_{63}$ is —O—, —COO—, —CONH—, or —OCO—, $n_{64}$ and $n_{66}$ are each independently integers ranging from 0 to 4, and $n_{61}$ to $n_{63}$ are each independently integers of 0 or 1.

[Chemical Formula 18]

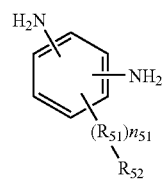

In the above Formula 18, $R_{51}$ is a single bond, —O—, —COO—, —OCO—, —NHCO—, or —CONH—, and $n_{51}$ is an integer ranging from 0 to 2, and $R_{52}$ is substituted or unsubstituted C1 to C20 alkyl; substituted or unsubstituted C6 to C30 aryl; substituted or unsubstituted C2 to C30 heteroaryl; or alkyl, aryl, or heteroaryl including —O—, —COO—, —CONH—, —OCO—, or a combination thereof.

The repeating unit of the above Formula 3 may be prepared by imidization of the repeating unit of the above Formula 1. The imidization of the polyamic acid to obtain the polyimide polymer is well known in this art and therefore a detailed description thereof is not provided.

The repeating unit of the above Formula 2 can be synthesized from at least one photodiamine and an acid dianhydride comprising an aliphatic cyclic acid dianhydride, an aromatic acid dianhydride, or a combination thereof.

The copolymerization of the photodiamine and acid dianhydride to obtain a polyamic acid photopolymer is well known in this art, and therefore a detailed description thereof is not provided. The aliphatic cyclic acid dianhydride or aromatic acid dianhydride used during preparation of the polyamic acid photopolymer is the same as the one used during preparation of the repeating unit represented by the above Formula 1.

The repeating unit of the above Formula 4 may be prepared by imidization of the repeating unit of the above Formula 2. The imidization of the polyamic acid to obtain the polyimide polymer is well known in this art and therefore a detailed description thereof is not provided.

Exemplary photodiamines suitable for use in the present invention include without limitation coumarin-based photodiamines, chalcone-based photodiamines, cinnamate-based photodiamines, and combinations thereof.

The cinnamate-based photodiamine may be a compound of the following Formula 19, a compound of the following Formula 20, or a combination thereof. The chalcone-based photodiamine may be a compound of the following Formula 21. The coumarin-based photodiamine may be a compound of the following Formula 22.

[Chemical Formula 19]

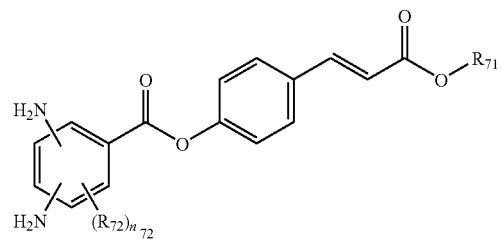

In the above Formula 19, $R_{71}$ is hydrogen, substituted or unsubstituted C1 to C30 alkyl, substituted or unsubstituted C6 to C30 aryl, or substituted or unsubstituted C2 to C30 heteroaryl, $R_{72}$ is substituted or unsubstituted C1 to C30 alkyl, substituted or unsubstituted C6 to C30 aryl, or substituted or unsubstituted C2 to C30 heteroaryl, and $n_{72}$ is an integer ranging from 0 to 3.

[Chemical Formula 20]

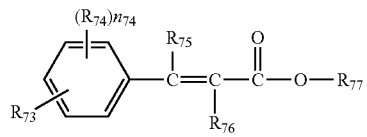

In the above Formula 20, $R_{77}$ is aromatic diamine, diamine including substituted or unsubstituted linear or branched C1 to C24 alkylene, or a combination thereof, wherein the substituted alkylene $R_{77}$ is substituted alkylene comprising at least one hydrogen substituted with halogen or cyano; substituted alkylene comprising at least one $CH_2$ group substituted with substituted or unsubstituted C6 to C30 arylene, substituted or unsubstituted C2 to C30 heteroarylene, substituted or unsubstituted C3 to C30 cycloalkylene, substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —CH=CH—, —C≡C—, or —O—CO—O— (wherein R' is hydrogen or substituted or unsubstituted C1 to C6 alkyl), wherein adjacent $CH_2$ groups are not so substituted; or a combination thereof, $R_{74}$ is substituted or unsubstituted C1 to C20 alkyl, substituted or unsubstituted C6 to C30 aryl, or substituted or unsubstituted C2 to C30 heteroaryl, $n_{74}$ is an integer ranging from 0 to 4, $R_{75}$ and $R_{76}$ are each independently hydrogen, halogen, cyano, or substituted or unsubstituted C1 to C12 alkyl, wherein the substituted alkyls of $R_{75}$ and $R_{76}$ are each independently substituted alkyl comprising at least one hydrogen substituted with halogen or cyano; substituted alkyl comprising at least one $CH_2$ group substituted with —O—, —CO—O—, —O—CO—, or —CH=CH—, wherein adjacent $CH_2$ groups are not so substituted; or a combination thereof, $R_{73}$ is substituted or unsubstituted C1 to C30 alkyl, substituted or unsubstituted C7 to C30 alkylaryl, substituted or unsubstituted C3 to C30 cycloalkyl, substituted or unsubstituted pyrimidinyl, substituted or unsubstituted pyridinyl, substituted or unsubstituted thiophenyl, substituted or unsubstituted furanyl, substituted or unsubstituted naphthyl, or substituted or unsubstituted phenyl, wherein the substituted alkyl of $R_{73}$ is substituted alkyl comprising at least one hydrogen substituted with halogen or cyano; substituted alkyl comprising at least one $CH_2$ group substituted with —O—, —CO—O—, —O—CO—, or —CH═CH—, wherein adjacent $CH_2$ groups are not so substituted; or a combination thereof, and wherein the substituted alkylaryl of $R_{73}$ is substituted alkylaryl comprising at least one $CH_2$ group substituted with —O—, —CO—O—, —O—CO—, or —CH═CH—, wherein adjacent $CH_2$ groups are not so substituted, or a combination thereof.

[Chemical Formula 21]

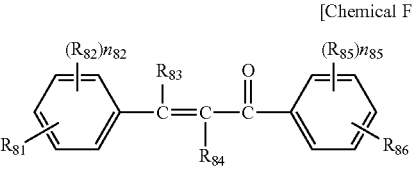

In the above Formula 21, $R_{81}$ is aromatic diamine, diamine including substituted or unsubstituted linear or branched C1 to C24 alkylene, or a combination thereof, wherein the substituted alkylene of $R_{81}$ is substituted alkylene comprising at least one hydrogen substituted with halogen or cyano; substituted alkylene comprising at least one $CH_2$ group substituted with substituted or unsubstituted C6 to C30 arylene, substituted or unsubstituted C2 to C30 heteroarylene, substituted or unsubstituted C3 to C30 cycloalkylene, substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —CH═CH—, —C≡C— or —O—CO—O— (wherein R' is hydrogen or substituted or unsubstituted C1 to C6 alkyl), wherein adjacent $CH_2$ groups are not so substituted; or a combination thereof, $R_{82}$ and $R_{85}$ are each independently substituted or unsubstituted C1 to C20 alkyl, substituted or unsubstituted C6 to C30 aryl, or substituted or unsubstituted C2 to C30 heteroaryl, $n_{82}$ and $n_{85}$ are each independently integers ranging from 0 to 4, $R_{83}$ and $R_{84}$ are each independently hydrogen, halogen, cyano, or substituted or unsubstituted C1 to C12 alkyl, wherein the substituted alkyls of $R_{83}$ and $R_{84}$ are each independently substituted alkyl comprising at least one hydrogen substituted with halogen or cyano; substituted alkyl comprising at least one $CH_2$ group substituted with —O—, —CO—O—, —O—CO—, or —CH═CH—, wherein adjacent $CH_2$ groups are not so substituted; or a combination thereof, $R_{86}$ is substituted or unsubstituted C1 to C30 alkyl, substituted or unsubstituted C7 to C30 alkylaryl, substituted or unsubstituted C3 to C30 cycloalkyl, substituted or unsubstituted pyrimidinyl, substituted or unsubstituted pyridinyl, substituted or unsubstituted thiophenyl, substituted or unsubstituted furanyl, substituted or unsubstituted naphthyl, or substituted or unsubstituted phenyl, wherein the substituted alkyl of $R_{86}$ is substituted alkyl comprising at least one hydrogen substituted with halogen or cyano; substituted alkyl comprising at least one $CH_2$ group substituted with —O—, —CO—O—, —O—CO—, or —CH═CH—, wherein adjacent $CH_2$ groups are not so substituted; or a combination thereof, and wherein the substituted alkylaryl of $R_{86}$ is substituted alkylaryl comprising at least one $CH_2$ group substituted with —O—, —CO—O—, —O—CO—, or —CH═CH—, wherein adjacent $CH_2$ groups are not so substituted, or a combination thereof.

[Chemical Formula 22]

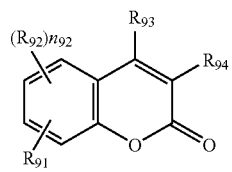

In the above Formula 22, $R_{91}$ is aromatic diamine, diamine including substituted or unsubstituted linear or branched C1 to C24 alkylene, or a combination thereof, wherein the substituted alkylene of $R_{91}$ is substituted alkylene comprising at least one hydrogen substituted with halogen or cyano; substituted alkylene comprising at least one $CH_2$ group substituted with substituted or unsubstituted C6 to C30 arylene, substituted or unsubstituted C2 to C30 heteroarylene, substituted or unsubstituted C3 to C30 cycloalkylene, substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —CH═CH—, —C≡C—, or —O—CO—O— (wherein R' is hydrogen or substituted or unsubstituted C1 to C6 alkyl), wherein adjacent $CH_2$ groups are not so substituted; or a combination thereof, $R_{92}$ is substituted or unsubstituted C1 to C20 alkyl, substituted or unsubstituted C6 to C30 aryl, or substituted or unsubstituted C2 to C30 heteroaryl, $n_{92}$ is an integer ranging from 0 to 4, $R_{93}$ and $R_{94}$ are each independently selected hydrogen, halogen, cyano, or substituted or unsubstituted C1 to C12 alkyl, and the substituted alkyls of $R_{93}$ and $R_{94}$ are each independently substituted alkyl comprising at least one hydrogen substituted with halogen or cyano; substituted alkyl comprising at least one $CH_2$ group substituted with —O—, —CO—O—, —O—CO—, or —CH═CH—, wherein adjacent $CH_2$ groups are not so substituted; or a combination thereof.

In one embodiment, the compound of the above Formula 22 can include the compound of the following Formula 23:

[Chemical Formula 23]

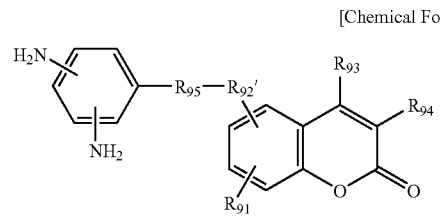

In the above Formula 23, $R_{91}$ is substituted or unsubstituted C1 to C20 alkyl, substituted or unsubstituted C6 to C30 aryl, or substituted or unsubstituted C2 to C30 heteroaryl, $R_{92}'$ is substituted or unsubstituted C1 to C20 alkylene, substituted or unsubstituted C6 to C30 arylene, or substituted or unsubstituted C2 to C30 heteroarylene, $R_{95}$ is a single bond, —O—, —CO—O—, —O—CO—, or —CH=CH—, $R_{93}$ and $R_{94}$ are each independently hydrogen, halogen, cyano, or substituted or unsubstituted C1 to C12 alkyl, and wherein the substituted alkyls of $R_{93}$ and $R_{94}$ are each independently substituted alkyl comprising at least one hydrogen substituted with halogen or cyano; substituted alkyl comprising at least one $CH_2$ group substituted with —O—, —CO—O—, —O—CO—, or —CH=CH—, wherein adjacent $CH_2$ groups are not so substituted; or a combination thereof.

$R_2$ and $R_4$ in the polyamic acid copolymer or $R_6$ and $R_8$ in the polyimide copolymer are present at a mole ratio of about 1 to 90:1 to 70. In one embodiment, the mole ratio of $R_2$ and $R_4$ and $R_6$ and $R_8$ ranges from about 3 to 90:5 to 40.

When the amount of $R_4$ in the polyamic acid copolymer or $R_8$ in the polyimide copolymer is less than this lower limit, liquid crystal alignment properties may not be properly realized. On the other hand, when the amount of $R_4$ or $R_8$ is greater than this upper limit, a liquid crystal alignment film may have deteriorated electrical characteristics.

When the polyamic acid copolymer or the polyimide copolymer includes a substituent derived from the functional diamine, the functional diamine and aromatic diamine excluding the functional diamine are present in a mole ratio ranging from about 1 to 50:1 to 90. In another embodiment, the functional diamine and aromatic diamine may be present in a mole ratio ranging from about 10 to 30:3 to 90.

When the functional diamine is present in an amount less than the lower limit of this mole ratio, the polyamic acid copolymer or the polyimide copolymer may not properly realize pretilt. When the functional diamine is present in an amount greater than the upper limit of this mole ratio, a polymer for a liquid crystal photo-alignment film with a high molecular weight may be hard to obtain.

The aromatic diamine rather than functional diamine can be any aromatic diamine, as long as it does not deteriorate characteristics of a liquid crystal photo-alignment agent.

The liquid crystal photo-alignment agent may have a number average molecular weight ranging from about 5000 to about 500,000 g/mol. When the liquid crystal photo-alignment agent has a number average molecular weight of less than about 5000 g/mol, there may be stains at the end of a substrate during printing. When the liquid crystal photo-alignment agent has a number average molecular weight of more than about 500,000 g/mol, the film may have a non-uniform thickness due to thickness deviation at the end of a substrate.

Another embodiment of the present invention provides a liquid crystal photo-alignment film that is provided by using the liquid crystal photo-alignment agent.

The liquid crystal photo-alignment film may be obtained by adding the liquid crystal photo-alignment agent to a solvent to provide a composition, and coating the composition on a substrate to provide a liquid crystal photo-alignment film.

Exemplary solvents suitable for use in the present invention may include without limitation N-methyl-2-pyrrolidone, N,N-dimethyl acetamide, N,N-dimethyl formamide, dimethyl sulfoxide, γ-butyro-lactone, and a phenol-based solvent such as a meta cresol, a phenol, a halogenated phenol, and the like, and combinations thereof.

In addition, the solvent may further include a poor solvent such as alcohol series, ketone series, ester series, ether series, hydrocarbon series, or halogenated hydrocarbon series solvents, as long as the soluble polyimide polymer is not deposited. The poor solvent lowers surface energy of a liquid crystal photo-alignment agent and improves its spread and flatness when the liquid crystal photo-alignment agent is coated.

The poor solvent may be included in an amount of about 1 to about 90 volume % based on the total amount of the solvent. In another embodiment, the poor solvent may be included in an amount of about 1 to about 70 volume %.

Examples of the poor solvent include without limitation methanol, ethanol, isopropanol, cyclohexanol, ethylene glycol, propylene glycol, 1,4-butanediol, triethylene glycol, acetone, methylethylketone, cyclohexanone, methyl acetate, ethyl acetate, butyl acetate, diethyl hydroxide, malonic acid ester, diethyl ether, ethylene glycol monomethyl ether, ethylene glycol monoethyl ether, ethylene glycol phenyl ether, ethylene glycol phenyl methyl ether, ethylene glycol phenyl ethyl ether, ethylene glycol dimethylethyl, diethylene glycol dimethylethyl, diethylene glycol ether, diethylene glycol monomethyl ether, diethylene glycol monoethyl ether, diethylene glycol monomethyl ether acetate, diethylene glycol monoethyl ether acetate, ethylene glycol methyl ether acetate, ethylene glycol ethyl ether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl butanoic acid methyl, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichloro butane, trichloro ethane, chlorobenzene, o-dichlorobenzene, hexane, heptane, octane, benzene, toluene, xylene, and the like, and combinations thereof.

The amount of solvent is not limited in the composition for forming a liquid crystal photo-alignment film. According to one embodiment of the present invention, the solid amount of the liquid crystal photo-alignment agent ranges from about 1 to about 30 wt %; in another embodiment, the solid amount of the liquid crystal photo-alignment agent ranges from about 3 to about 15 wt %; and in a further embodiment, the solid amount of the liquid crystal photo-alignment agent ranges from about 5 to about 10 wt %. When the solid amount is less than about 1 wt %, the film may be affected by the printing process so that the film uniformity is deteriorated; on the other hand, when the solid content is more than about 30 wt %, the film uniformity can deteriorate and the transmittance can also deteriorate due to the high viscosity during the printing process.

The composition for forming a liquid crystal photo-alignment film may include one or more epoxy compounds having 2 to 4 epoxy functional groups to improve reliability and electro-optical characteristics. The composition can include epoxy compound in an amount of about 0.01 to about 50 parts by weight, based on 100 parts by weight of the liquid crystal photo-alignment agent. In another embodiment, the composition can include epoxy compound in an amount of about 1 to about 30 parts by weight. When the composition includes epoxy compound in an amount of more than about 50 parts by weight, the epoxy compound may deteriorate printability or flatness. When the composition includes epoxy compound in an amount of less than about 0.01 parts by weight, the composition may show little effect of the epoxy compound.

Examples of the epoxy compound include without limitation N,N,N',N'-tetraglycidyl-4,4'-diaminophenylmethane (TGDDM), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N', N'-tetraglycidyl-4,4'-diaminobenzene, and the like, and combinations thereof.

The composition for forming a liquid crystal photo-alignment film can further include a silane coupling agent or a surfactant to improve adherence to a substrate, and flatness and coating characteristics.

The composition for forming a liquid crystal photo-alignment film is coated on a substrate to form a liquid crystal photo-alignment film. The composition for forming a liquid crystal photo-alignment film can be coated using any suitable method such as spin coating, flexo printing, Inkjet printing, and the like. Flexo printing can accomplish excellent film uniformity and may easily form a larger liquid crystal photo-alignment film.

The present invention is not limited to any particular substrate. Exemplary substrates suitable for use in the present invention may include without limitation glass substrates or plastic substrates such as an acryl substrate or a polycarbonate substrate, as long as it is transparent. In addition, the substrate may include an ITO electrode and the like for liquid crystal operation to simplify the manufacturing process.

In order to improve uniformity of a film, the composition for forming a liquid crystal photo-alignment film may be uniformly coated on a substrate and predried at room temperature to about 200° C., about 30 to about 150° C., or about 40 to about 120° C., for about 1 to about 100 minutes. The predrying can control volatility of each component of the composition for forming a liquid crystal photo-alignment film, to provide a uniform film without a thickness deviation.

Then, the coated substrate can be fired at a temperature of about 80 to about 300° C. or about 120 to about 280° C. for about 5 to about 300 minutes to completely evaporate a solvent, to fabricate a liquid crystal photo-alignment film.

The liquid crystal photo-alignment film can be used for a liquid crystal display with uniaxial alignment treatment by polarized ultraviolet (UV) rays or rubbing, or without the uniaxial alignment treatment for some uses such as a vertical alignment film and the like.

The liquid crystal photo-alignment film according to one embodiment of the present invention can be subjected to uniaxial alignment treatment by exposing to light with energy of about 10 mJ to about 5000 mJ for about 0.1 to about 180 minutes. As mentioned above, the uniaxial alignment treatment can be performed with a reduced exposure intensity so as to completely remove double bonds included in the polyimide photopolymer.

According to a further embodiment of the present invention, provided is a display device including the liquid crystal photo-alignment film. In another embodiment, the display device is a liquid crystal display (LCD).

FIG. 1 is a cross-sectional view showing a liquid crystal display (LCD) according to one embodiment of the present invention.

As shown in FIG. 1, the liquid crystal display (LCD) 1 according to one embodiment of the present invention includes a lower panel 100, an upper panel 200, and a liquid crystal layer 3.

In the lower panel 100, a gate conductor including a plurality of gate lines (not shown) and a plurality of storage electrodes 133 is formed on a front surface of a first substrate 110. On the gate conductor, a gate insulating layer 140, a plurality of semiconductors 154, a plurality of pairs of ohmic contacts 163 and 165, a plurality of source electrodes 173, and a plurality of drain electrodes 175 are sequentially formed.

One thin film transistor (TFT) consists of one gate electrode 124, one source electrode 173, and one drain electrode 175 together with a semiconductor 154.

A passivation layer 180 is formed on the exposed portion of the semiconductor 154, the source electrode 173, the drain electrode 175, and the gate insulating layer 140. On the passivation layer 180, a plurality of pixel electrodes 191 are formed.

Hereinafter, the upper panel 200 is described.

In the upper panel 200, a light blocking member 220 is formed on a second substrate 210. A plurality of color filters 230 is formed on the second substrate 210 and the light blocking member 220, and an overcoat 250 is formed on the color filter 230. The overcoat 250 is to prevent the color filter 230 from being exposed to the liquid crystal layer 3, and the overcoat 250 can be omitted.

A first liquid crystal photo-alignment film 12 is formed on the surface of the pixel electrode 191 of the lower panel 100, and a second liquid crystal photo-alignment film 22 is formed on the surface of a common electrode 270 of the upper panel 200. The first liquid crystal photo-alignment film 12 and the second liquid crystal photo-alignment film 22 are fabricated by using the liquid crystal photo-alignment agent according to one embodiment of the present invention.

Even though the liquid crystal photo-alignment films 12 and 22 are shown to be respectively formed on the lower panel 100 and the upper panel 200 in FIG. 1, the liquid crystal photo-alignment film 12 or 22 may be formed in either the upper panel 200 or the lower panel 100.

The following examples illustrate the present invention in more detail. These examples, however, should not in any sense be interpreted as limiting the scope of the present invention.

EXAMPLE 1

Preparation of a Liquid Crystal Photo-alignment Agent Including a Polyamic Acid Copolymer (PAA-1)

0.7 mol of phenylene diamine, 0.15 mol of a functional diamine 3,5-diaminophenyl decyl succinimide of the following Chemical Formula 24, and 0.15 mol of diamino benzoic acid 4-(2-ethoxycarbonyl-vinyl)-phenyl ester of the following Chemical Formula 25 are introduced into a four-necked flask mounted with an agitator, a temperature controller, a nitrogen gas injector, and a cooler while flowing nitrogen therethrough, and N-methyl-2-pyrrolidone (NMP) is added thereto to provide a mixed solution.

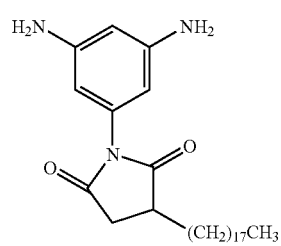

[Chemical Formula 24]

[Chemical Formula 25]

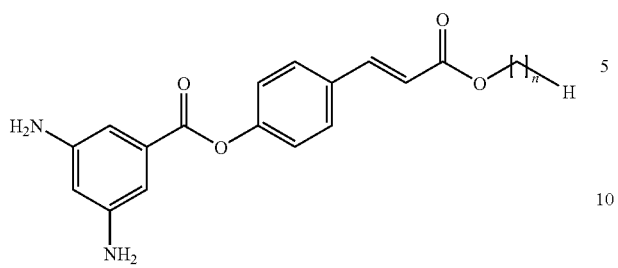

In the above Formula 25, n=2.

1.0 mol of solid 1,2,3,4-cyclobutanetetracarboxylic acid dianhydride is added to the mixed solution and vigorously agitated. The solid amount is 20 wt%. The reaction is performed while maintaining the temperature between 30° C. and 50° C. for 10 hours to provide a polyamic acid resin. To the provided polyamic acid resin, a mixed organic solvent of N-methyl-2-pyrrolidone and γ-butyrolactone (NMP:GBL=7:3weight ratio) is added and agitated at room temperature for 24 hours to provide a liquid crystal photo-alignment agent including a polyamic acid solution (PAA-1).

EXAMPLE 2

Preparation of a Liquid Crystal Photo-alignment Agent Including a Polyamic Acid Copolymer (PAA-2)

A liquid crystal photo-alignment agent including a polyamic acid solution (PAA-2) is prepared in accordance with the same procedure as in Example 1, except that the functional diamine represented by the following Chemical Formula 26 is used instead of the functional diamine represented by Chemical Formula 24.

[Chemical Formula 26]

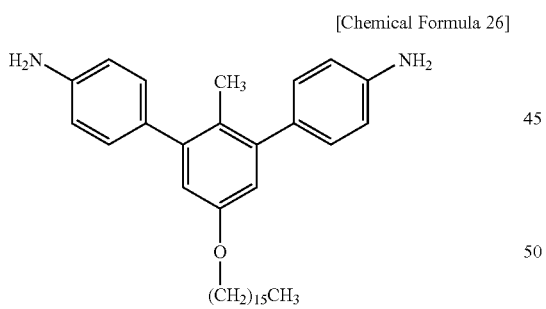

EXAMPLE 3

Preparation of a Liquid Crystal Photo-Alignment Agent Including a Polyamic Acid Copolymer (PAA-3)

A liquid crystal photo-alignment agent including a polyamic acid solution (PAA-3) is prepared in accordance with the same procedure as in Example 1, except that the functional diamine represented by the following Chemical Formula 27 is used instead of the functional diamine represented by Chemical Formula 24.

[Chemical Formula 27]

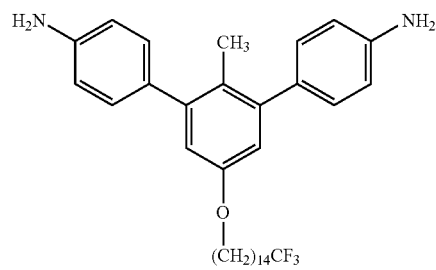

EXAMPLE 4

Preparation of a Liquid Crystal Photo-alignment Agent Including a Polyamic Acid Copolymer (PAA-4)

A liquid crystal photo-alignment agent including a polyamic acid solution (PAA-4) is prepared in accordance with the same procedure as in Example 1, except that the functional diamine represented by the following Chemical Formula 28 is used instead of the functional diamine represented by Chemical Formula 24.

[Chemical Formula 28]

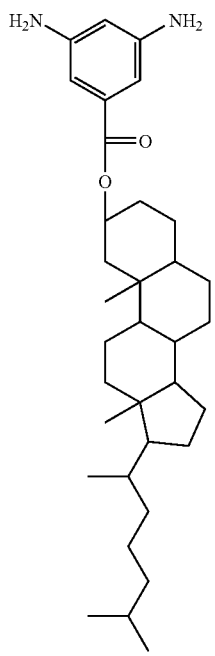

EXAMPLE 5

Preparation of a Liquid Crystal Photo-alignment Agent Including a Polyamic Acid Copolymer (PAA-5)

A liquid crystal photo-alignment agent including a polyamic acid solution (PAA-5) is prepared in accordance with the same procedure as in Example 1, except that 1,2,4- tricarboxyl-3-methylcarboxyl cyclopentane dianhydride is used instead of the 1,2,3,4-cyclobutanetetracarboxylic acid dianhydride.

EXAMPLE 6

Preparation of a Liquid Crystal Photo-alignment Agent Including a Polyamic Acid Copolymer (PAA-6)

A liquid crystal photo-alignment agent including a polyamic acid solution (PAA-6) is prepared in accordance with the same procedure as in Example 1, except that the functional diamine represented by the above Chemical Formula 26 is used instead of the functional diamine represented by Chemical Formula 24, and 1,2,4-tricarboxyl-3-methylcarboxyl cyclopentane dianhydride is used instead of the 1,2,3,4-cyclobutanetetracarboxylic acid dianhydride.

EXAMPLE 7

Preparation of a Liquid Crystal Photo-alignment Agent Including a Polyamic Acid Copolymer (PAA-7)

A liquid crystal photo-alignment agent including a polyamic acid solution (PAA-7) is prepared in accordance with the same procedure as in Example 1, except that the functional diamine represented by the above Chemical Formula 27 is used instead of the functional diamine represented by Chemical Formula 24, and 1,2,4-tricarboxyl-3-methylcarboxyl cyclopentane dianhydride is used instead of the 1,2,3,4-cyclobutanetetracarboxylic acid dianhydride.

EXAMPLE 8

Preparation of a Liquid Crystal Photo-alignment Agent Including a Polyamic Acid Copolymer (PAA-8)

A liquid crystal photo-alignment agent including a polyamic acid solution (PAA-8) is prepared in accordance with the same procedure as in Example 1, except that the functional diamine represented by the above Chemical Formula 28 is used instead of the functional diamine represented by Chemical Formula 24 and 1,2,4-tricarboxyl-3-methylcarboxyl cyclopentane dianhydride was used instead of the 1,2,3,4-cyclobutanetetracarboxylic acid dianhydride.

EXAMPLE 9

Preparation of a Liquid Crystal Photo-alignment Agent Including a Polyamic Acid Copolymer (PAA-9)

A liquid crystal photo-alignment agent including a polyamic acid copolymer (PAA-9) is prepared according to the same method as in Example 5 except for using 0.75 mol of phenylene diamine, 0.15 mol of the functional diamine 3,5-diaminophenyldecyl succinimide represented by the above Chemical Formula 24, and 0.05 mol of diamino benzoic acid 4- (2-ethoxycarbonyl-vinyl)-phenyl ester represented by Chemical Formula 25.

EXAMPLE 10

Preperation of a Liquid Crystal Photo-alignment Agent Including a Polyamic Acid Copolymer (PAA-10)

A liquid crystal photo-alignment agent including a polyamic acid copolymer (PAA-10) is prepared according to the same method as in Example 5 except for using 0.6 mol of phenylene diamine, 0.15 mol of functional diamine 3,5-diaminophenyldecyl succinimide represented by the above formula 24, and 0.25 mol of diamino benzoic acid 4- (2-ethoxycarbonyl-vinyl)-phenyl ester represented by Chemical Formula 25.

EXAMPLE 11

Preparation of a Liquid Crystal Photo-alignment Agent Including a Polyamic Acid Copolymer (PAA-11)

A liquid crystal photo-alignment agent including a polyamic acid copolymer (PAA-11) is prepared according to the same method as in Example 5 except for using a photo-reactive diamine represented by Chemical Formula 29 instead of a photo-reactive diamine represented by Chemical Formula 25.

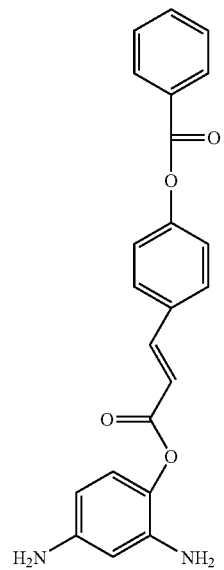

[Chemical Formula 29]

EXAMPLE 12

Preparation of a Liquid Crystal Photo-alignment Agent Including a Polyamic Acid Copolymer (PAA-12)

A liquid crystal photo-alignment agent including a polyamic acid copolymer (PAA-12) is prepared according to the same method as in Example 5 except for using a photoreactive diamine represented by Chemical Formula 30 instead of a photo-reactive diamine represented by Chemical Formula 25.

[Chemical Formula 30]

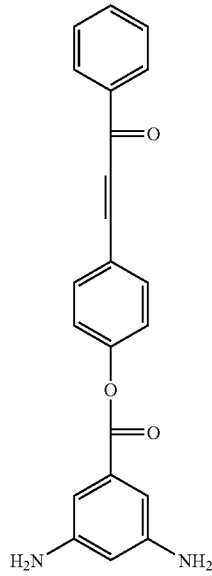

EXAMPLE 13

Preparation of a Liquid Crystal Photo-alignment Agent Including a Polyamic Acid Copolymer (PAA-13)

A liquid crystal photo-alignment agent including a polyamic acid copolymer (PAA-13) is prepared according to the same method as in Example 5 except for using a photo-reactive diamine represented by Chemical Formula 31 instead of a photo-reactive diamine represented by Chemical Formula 25.

[Chemical Formula 31]

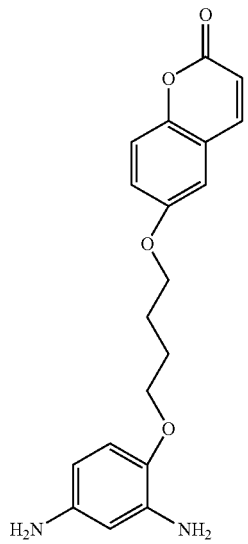

EXAMPLE 14

Preparation of a Liquid Crystal Photo-alignment Agent Including a Polyimide Copolymer (SPI-1)

PAA-1 and N-methyl-2-pyrrolidone is put up to 20 wt % in a 4 neck flask with an agitator, a temperature controller, a nitrogen gas implanting device, and a cooler while passing nitrogen through the flask.

Then, 3.0 mol of acetic acid anhydride and 5.0 mol of pyridine are added to the above polyamic acid copolymer. The resulting solution is heated up to 80° C. and reacted for 6 hours, and then vacuum-distilled to remove a catalyst and a solvent, preparing a polyimide copolymer including 20 wt % of a solid.

Then, a mixed organic solvent of N-methyl-2-pyrrolidone and y-butyrolactone (NMP:GBL=7:3 weight ratio) is added to the polyimide copolymer. The resulting mixture is agitated at room temperature for 24 hours, to prepare a liquid crystal photo-alignment agent including a polyimide copolymer (SPI-1).

EXAMPLE 15

Preparation of a Liquid Crystal Photo-alignment Agent Including a Polyimide Copolymer (SPI-2)

A liquid crystal photo-alignment agent including a polyimide copolymer (SPI-2) is prepared according to the same method as Example 14 except for using PAA-2 instead of PAA-1.

EXAMPLE 16

Preparation of a liquid crystal photo-alignment agent including a polyimide copolymer (SPI-3)

A liquid crystal photo-alignment agent including a polyimide copolymer (SPI-3) is prepared according to the same method as Example 14 except for using PAA-3 instead of PAA-1.

EXAMPLE 17

Preparation of a Liquid Crystal Photo-alignment Agent Including a Polyimide Copolymer (SPI-4)

A liquid crystal photo-alignment agent including a polyimide copolymer (SPI-4) is prepared according to the same method as Example 14 except for using PAA-4 instead of PAA-1.

EXAMPLE 18

Preparation of a Liquid Crystal Photo-alignment Agent Including a Polyimide Copolymer (SPI-5)

A liquid crystal photo-alignment agent including a soluble polyimide copolymer (SPI-5) is prepared according to the same method as Example 14 except for using PAA-5 instead of PAA-1.

EXAMPLE 19

Preparation of a Liquid Crystal Photo-alignment Agent Including a Polyimide Copolymer (SPI-6)

A liquid crystal photo-alignment agent including a soluble polyimide copolymer (SPI-6) is prepared according to the same method as Example 14 except for using PAA-6 instead of PAA-1.

EXAMPLE 20

Preparation of a Liquid Crystal Photo-alignment Agent Including a Polyimide Copolymer (SPI-7)

A liquid crystal photo-alignment agent including a polyimide copolymer (SPI-7) is prepared according to the same method as Example 14 except for using PAA-7 instead of PAA-1.

EXAMPLE 21

Preparation of a Liquid Crystal Photo-alignment Agent Including a Polyimide Copolymer (SPI-8)

A liquid crystal photo-alignment agent including a soluble polyimide copolymer (SPI-8) is prepared according to the same method as Example 14 except for using PAA-8 instead of PAA-1.

EXAMPLE 22

Preparation of a Liquid Crystal Photo-alignment Agent Including a Polyimide Copolymer (SPI-9)

A liquid crystal photo-alignment agent including a soluble polyimide copolymer (SPI-9) is prepared according to the same method as Example 14 except for using PAA-9 instead of PAA-1.

EXAMPLE 23

Preparation of a Liquid Crystal Photo-alignment Agent Including a Polyimide Copolymer (SPI-10)

A liquid crystal photo-alignment agent including a soluble polyimide copolymer (SPI-10) is prepared according to the same method as Example 14 except for using PAA-10 instead of PAA-1.

EXAMPLE 24

Preparation of a Liquid Crystal Photo-alignment Agent Including a Polyimide Copolymer (SPI-11)

A liquid crystal photo-alignment agent including a soluble polyimide copolymer (SPI-11) is prepared according to the same method as Example 14 except for using PAA-11 instead of PAA-1.

EXAMPLE 25

Preparation of a Liquid Crystal Photo-alignment Agent Including a Polyimide Copolymer (SPI-12)

A liquid crystal photo-alignment agent including a soluble polyimide copolymer (SPI-12) is prepared according to the same method as Example 14 except for using PAA-12 instead of PAA-1.

EXAMPLE 26

Preparation of a Liquid Crystal Photo-alignment Agent Including a Polyimide Copolymer (SPI-13)

A liquid crystal photo-alignment agent including a soluble polyimide copolymer (SPI-13) is prepared according to the same method as Example 14 except for using PAA-13 instead of PAA-1.

COMPARATIVE EXAMPLE 1

A mixed solution is prepared by putting 0.5 mol of phenylene diamine, 0.5 mol of diamino benzoic acid 4-(2-ethoxycarbonyl-vinyl)-phenyl ester represented by the above Chemical Formula 25, and N-methyl-2-pyrrolidone in a four-necked flask with an agitator, a temperature controller, a nitrogen gas implanting device, and a cooler in a dark room while passing nitrogen through the flask.

Next, 1.0 mol of solid 1,2,3,4-cyclobutanetetracarboxylic acid dianhydride is added to the mixed solution, and then vigorously agitated together. Herein, the mixed solution included 20 wt % of the solid and is reacted for 24 hours at the temperature of 30° C. to 80° C. to prepare a polyamic acid solution.

Next, 3.0 mol of acetic acid anhydride and 5.0 mol of pyridine are added to the polyamic acid solution. The resulting solution is heated up to 80° C., reacted for 6 hours, and vacuum-distilled to remove a catalyst and a solvent, tp prepare a soluble polyimide photopolymer including 20% of the solid.

Then, a mixed organic solvent of N-methyl-2-pyrrolidone and γ-butyrolactone (NMP:GBL=7:3 weight ratio) is added to the soluble polyimide photopolymer. The resulting mixture is agitated at room temperature for 24 hours, to prepare a liquid crystal photo-alignment agent including a soluble polyimide copolymer.

COMPARATIVE EXAMPLE 2

A liquid crystal photo-alignment agent including a polyimide copolymer is prepared according to the same method as Comparative Example 2 except for using 1.0 mol of a compound represented by the above Chemical Formula 25.

Printability Evaluation

The liquid crystal photo-alignment agents prepared according to Examples 1 to 26 and Comparative Examples 1 and 2 are coated on a 10 cm×10 cm ITO substrate and spin-coated to a uniform thickness of 0.1 μm. Then, the coated substrates are placed on a hot plate at 70° C. to remove solvent and cured at 210° C., to prepare a liquid crystal photo-alignment film.

The obtained liquid crystal photo-alignment films are observed for the diffusion characteristic and the rolling characteristic via the naked eye and an optical microscope to determine the printability of the liquid crystal photo-alignment agent. The results of the printability determination are shown in the following Table 1.

Liquid Crystal Alignment Property Evaluation

A liquid crystal cell is used to evaluate liquid crystal alignment properties of liquid crystal photo-alignment agents. The liquid crystal cell is fabricated as follows.

Photolithography for patterning is performed to remove the rest of ITO except for 0.5 cm×1.5 cm ITO and an ITO electrode shape for voltage application on a standardized ITO glass substrate.

Next, the liquid crystal photo-alignment agents of Examples 1 to 26 and Comparative Examples 1 and 2 are spin-coated to a thickness of 0.1 μm on the patterned ITO substrate and cured at a temperature of 70° C. and 210° C.

The cured ITO substrate is exposed to light at a predetermined angle under a predetermined energy with an exposing device (UIS-S2021J7-YD01, Ushio LPUV). Then, the two substrates are arranged in an opposite exposure direction (VA mode, 90°) with their vertexes corresponding each other and having a 4.75 μm cell gap between them, and then bonded to each other. During the exposure, a light source is a 2 kW deep UV ramp (UXM-2000).

Then, liquid crystal is filled in the cell. Its alignment property is examined with a crossed and polarizing light microscope, and the results are provided in the following Table 1.

Pretilt Angle Evaluation

A liquid crystal cell for evaluating a pretilt angle is separately fabricated to maintain a cell gap of 50 μm in a different method from the above.

Herein, a crystal rotation method is used to measure pretilt angle of liquid crystal photo-alignment films prepared using the liquid crystal photo-alignment agents of Examples 1 to 26 and Comparative Examples 1 and 2 after fabricating a liquid crystal cell with a 50 μm cell gap. The results are shown in the following Table 1.

Electrical and Optical Characteristics Evaluation

Liquid crystal photo-alignment films prepared using a liquid crystal photo-alignment agent of the present invention are evaluated regarding electrical and optical characteristics by measuring voltage-transmission curves, voltage holding ratio, and residual DC voltage of a liquid crystal cell with a 4.75 μm cell gap.

Electrical and optical characteristics of the voltage-transmission curve, voltage holding ratio, and residual DC voltage are briefly illustrated as follows.

The voltage-transmission curve is an important electric and optical characteristic determining driving voltage of a liquid crystal display (LCD) and is obtained by standardizing transmissivity measured while voltage is applied into the liquid crystal cell based on a quantity of light of 100% when it is the brightest and a quantity of light of 0% when it is the darkest.

The voltage holding ratio indicates to what degree a liquid crystal layer floats from an outer power source during a non-selective period in a TFT-LCD of an active matrix method. When the voltage holding ratio is closer to 100%, it indicates a more ideal ratio.

The residual DC voltage indicates a voltage remaining in a liquid crystal layer since ionized impurities therein are absorbed in an alignment film. The lower the voltage is, the better it is. The residual DC voltage can be in general measured by using a flicker and a curved line (C-V) showing electrical capacity change of a liquid crystal layer according to DC voltages. The measurement results of the electrical and optical characteristics are shown in the following Table 2. In the Table 1, the molecular weight (Mw) is determined by GPC.

TABLE 1

| Sample | Molecular Weight (Mn, ×10⁴) | Printability | Vertical alignment property | Photo-alignment property | Pretilt angle (°) |
|---|---|---|---|---|---|
| Example 1 | 12 | good | good | good | 89.21 |
| Example 2 | 18 | good | good | good | 89.45 |
| Example 3 | 22 | good | good | good | 89.66 |
| Example 4 | 32 | good | good | good | 89.75 |
| Example 5 | 24 | good | good | good | 89.38 |
| Example 6 | 25 | good | good | good | 89.59 |
| Example 7 | 42 | good | good | good | 89.62 |
| Example 8 | 23 | good | good | good | 89.65 |
| Example 9 | 34 | good | good | good | 89.82 |
| Example 10 | 38 | good | good | good | 89.74 |
| Example 11 | 22 | good | good | good | 89.91 |
| Example 12 | 25 | good | good | good | 89.86 |
| Example 13 | 15 | good | good | good | 89.88 |
| Example 14 | 18 | good | good | good | 89.92 |
| Example 15 | 28 | good | good | good | 89.78 |
| Example 16 | 21 | good | good | good | 89.93 |
| Example 17 | 24 | good | good | good | 89.72 |
| Example 18 | 29 | good | good | good | 89.81 |
| Example 19 | 17 | good | good | good | 89.86 |
| Example 20 | 21 | good | good | good | 89.68 |
| Example 21 | 29 | good | good | good | 89.71 |
| Example 22 | 33 | good | good | good | 89.78 |
| Example 23 | 41 | good | good | good | 89.92 |
| Example 24 | 29 | good | good | good | 89.27 |
| Example 25 | 35 | good | good | good | 89.57 |
| Example 26 | 38 | good | good | good | 89.82 |
| Comparative Example 1 | 25 | good | good | good | 89.89 |
| Comparative Example 2 | 32 | good | good | good | 89.90 |

TABLE 2

| | | Voltage holding ratio (%) | | |
|---|---|---|---|---|
| Sample | Voltage-transmission | Room temperature 25° C. | High temperature 60° C. | Residual DC (by C-V) |
| Example 1 | good | 99.42 | 98.15 | 142 |
| Example 2 | good | 99.25 | 98.12 | 138 |
| Example 3 | good | 99.22 | 98.23 | 154 |
| Example 4 | good | 99.52 | 98.26 | 106 |
| Example 5 | good | 99.48 | 98.18 | 72 |
| Example 6 | good | 99.56 | 99.16 | 83 |
| Example 7 | good | 99.59 | 99.15 | 69 |
| Example 8 | good | 99.67 | 99.12 | 72 |
| Example 9 | good | 98.61 | 98.31 | 92 |
| Example 10 | good | 98.43 | 98.08 | 61 |
| Example 11 | good | 99.53 | 98.36 | 78 |
| Example 12 | good | 99.52 | 98.32 | 85 |
| Example 13 | good | 99.57 | 99.28 | 77 |
| Example 14 | good | 99.56 | 99.11 | 26 |
| Example 15 | good | 99.48 | 99.10 | 16 |
| Example 16 | good | 99.33 | 99.07 | 24 |
| Example 17 | good | 99.49 | 99.22 | 31 |
| Example 18 | good | 99.42 | 99.14 | 16 |
| Example 19 | good | 99.60 | 99.20 | 5 |
| Example 20 | good | 99.60 | 99.23 | 11 |
| Example 21 | good | 99.72 | 99.22 | 25 |
| Example 22 | good | 99.52 | 99.29 | 42 |
| Example 23 | good | 99.30 | 99.01 | 30 |
| Example 24 | good | 99.55 | 99.16 | 25 |
| Example 25 | good | 99.53 | 99.17 | 19 |
| Example 26 | good | 99.66 | 99.20 | 16 |
| Comparative Example 1 | good | 98.51 | 97.31 | 332 |
| Comparative Example 2 | good | 98.38 | 94.08 | 401 |

Referring to Table 1, the liquid crystal photo-alignment agents of Examples 1 to 26 have such good printability, vertical alignment property, photo-alignment property, and pretilt angle that they can be prepared into a liquid crystal photo-alignment film.

Referring to Table 2, the liquid crystal photo-alignment agents of Examples 1 to 26 have good voltage-transmissivity and a voltage holding ratio of more than about 99%. On the contrary, the liquid crystal photo-alignment agents of Comparative Examples 1 and 2 have a voltage holding ratio of less than 99%.

In addition, the liquid crystal photo-alignment agents of Examples 1 to 26 have low residual DC, while the ones of Comparative Examples 1 and 2 have high residual DC. The liquid crystal photo-alignment agents of the present can have a low residual DC of less than about 200, for example less than about 150, as another example less than about 100, and as another example less than about 50, although the present invention is not so limited.

The voltage holding ratio and residual DC are used as criteria for evaluating the after-image characteristic of a liquid crystal photo-alignment film. A higher voltage holding ratio and lower residual DC indicates a better after-image characteristic. Therefore, the liquid crystal photo-alignment agents of Examples 1 to 26 have a better after-image characteristic than the liquid crystal photo-alignment agents of the comparative examples.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A liquid crystal photo-alignment agent comprising a polyamic acid copolymer including a repeating unit having the following Formula 1 and a repeating unit having the following Formula 2, a polyimide copolymer including a repeating unit having the following Formula 3 and a repeating unit having the following Formula 4, or a combination thereof:

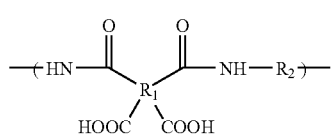

[Chemical Formula 1]

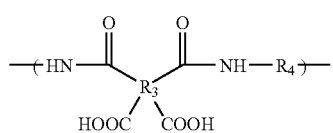

[Chemical Formula 2]

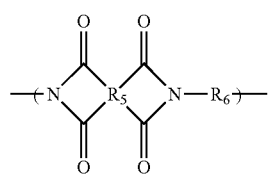

[Chemical Formula 3]

-continued

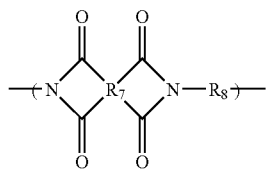

[Chemical Formula 4]

wherein, in the above Formulae 1 to 4, $R_1$, $R_3$, $R_5$, and $R_7$ are each independently a quadrivalent organic group derived from an acid dianhydride comprising an aliphatic cyclic acid dianhydride or an aromatic acid dianhydride, $R_2$ and $R_6$ are each independently divalent organic groups derived from an aromatic diamine, wherein the aromatic diamine comprises a functional diamine and an aromatic diamine excluding the functional diamine, and $R_4$ and $R_8$ are each independently divalent organic groups derived from a photodiamine comprising a coumarin-based photodiamine, chalcone-based photodiamine, or cinnamate-based photodiamine.

2. The liquid crystal photo-alignment agent of claim 1, wherein the aliphatic cyclic acid dianhydride is 1,2,3,4-cyclobutanetetracarboxylic acid dianhydride (CBDA), 5-(2,5-dioxotetrahydrofuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxyl-3-methylcarboxyl cyclopentane dianhydride, 1,2,3,4-tetracarboxyl cyclopentane dianhydride, or a combination thereof.

3. The liquid crystal photo-alignment agent of claim 1, wherein $R_1$, $R_3$, $R_5$, and $R_7$ are each independently quadrivalent organic groups represented by one or more of the following Formulae 5 to 9, or a combination thereof:

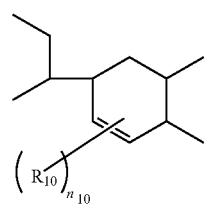

[Chemical Formula 5]

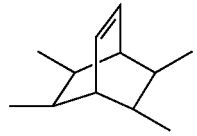

[Chemical Formula 6]

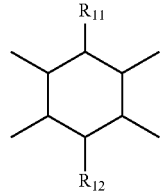

[Chemical Formula 7]

-continued

[Chemical Formula 8]

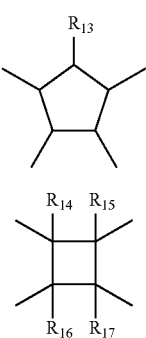

[Chemical Formula 9]

wherein, in the above Formulae 5 to 9, $R_{10}$ is substituted or unsubstituted C1 to C20 alkyl, substituted or unsubstituted C6 to C30 aryl, or substituted or unsubstituted C2 to C30 heteroaryl, and $n_{10}$ is an integer ranging from 0 to 3, $R_{11}$ to $R_{17}$ are each independently hydrogen, substituted or unsubstituted C1 to C20 alkyl, substituted or unsubstituted C6 to C30 aryl, or substituted or unsubstituted C2 to C30 heteroaryl, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof.

4. The liquid crystal photo-alignment agent of claim 1, wherein the aromatic acid dianhydride is pyromellitic acid dianhydride (PMDA), biphthalic acid dianhydride (BPDA), oxydiphthalic acid dianhydride (ODPA), benzophenonetetracarboxylic acid dianhydride (BTDA), hexafluoroisopropylidene diphthalic acid dianhydride (6-FDA), or a combination thereof.

5. The liquid crystal photo-alignment agent of claim 1, wherein $R_1$, $R_3$, $R_5$, and $R_7$ are each independently quadrivalent organic groups represented by one or more of the following Formulae 10 and 11 or a combination thereof:

[Chemical Formula 10]

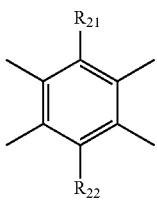

[Chemical Formula 11]

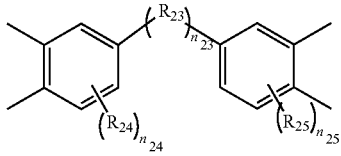

wherein, in the above Formulae 10 and 11, $R_{21}$ and $R_{22}$ are each independently hydrogen, substituted or unsubstituted C1 to C20 alkyl, substituted or unsubstituted C6 to C30 aryl, or substituted or unsubstituted C2 to C30 heteroaryl, $R_{24}$ and $R_{25}$ are each independently substituted or unsubstituted C1 to C20 alkyl, substituted or unsubstituted C6 to C30 aryl, or substituted or unsubstituted C2 to C30 heteroaryl, and $n_{24}$ and $n_{25}$ are each independently integers ranging from 0 to 3, $R_{23}$ is O, CO, $C(CF_3)_2$, substituted or unsubstituted C1 to C6 alkylene, substituted or unsubstituted C3 to C30 cycloalkylene, or substituted or unsubstituted C2 to C30 heterocycloalkylene, and $n_{23}$ is an integer of 0 or 1, and wherein each of said substituted C1 to C20 alkyl, substituted C6 to C30 aryl, substituted C2 to C30 heteroaryl, substituted C1 to C6 alkylene, substituted C3 to C30 cycloalkylene, or substituted C2 to C30 heterocycloalkylene independently comprises at least one substituent selected from halogen, C1 to C30 alkyl, C1 to C30 haloalkyl, C6 to C30 aryl, C2 to C30 heteroaryl, C1 to C20 alkoxy, or a combination thereof.

6. The liquid crystal photo-alignment agent of claim 1, wherein the aromatic diamine excluding the functional diamine is paraphenylenediamine (p-PDA), 4,4-methylene dianiline (MDA), 4,4-oxydianiline (ODA), metabisaminophenoxy diphenylsulfone (m-BAPS), parabisaminophenoxy diphenylsulfone (p-BAPS), 2,2-bis[(aminophenoxy)phenyl]propane (BAPP), 2,2-bisaminophenoxyphenylhexafluoropropane (HF-BAPP), 1,4-diamino-2-methoxybenzene, 3,3'-diphenyl benzidine, or a combination thereof.

7. The liquid crystal photo-alignment agent of claim 1, wherein $R_2$ and $R_6$ are each independently divalent organic groups represented by one or more of the following Formulae 12 to 14, or a combination thereof:

[Chemical Formula 12]

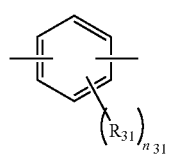

[Chemical Formula 13]

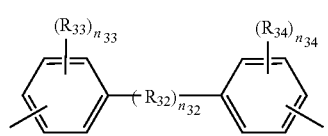

[Chemical Formula 14]

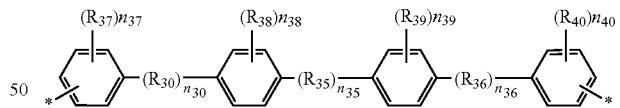

wherein, in the above Formulae 12 to 14, $R_{31}$, $R_{33}$, $R_{34}$, and $R_{37}$ to $R_{40}$ are each independently substituted or unsubstituted C1 to C20 alkyl, substituted or unsubstituted C6 to C30 aryl, or substituted or unsubstituted C2 to C30 heteroaryl, wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, —O—, —COO—, —CONH—, —OCO—, or a combination thereof, $R_{30}$, $R_{32}$, $R_{35}$, and $R_{36}$ are each independently O, $SO_2$, or C(R')(R"), wherein R' and R" are each independently hydrogen or substituted or unsubstituted C1 to C6 alkyl, wherein said substituted C1 to C6 alkyl comprises at least one substituent selected from halogen, C1 to C30 alkyl, C1 to C30 haloalkyl, C6 to C30 aryl, C2 to C30 heteroaryl, C1 to C20 alkoxy, $n_{31}$, $n_{33}$, $n_{34}$, and $n_{37}$ to $n_{40}$ are each independently integers ranging from 0 to 4, and $n_{30}$, $n_{32}$, $n_{35}$, and $n_{36}$ are each independently integers of 0 or 1.

8. The liquid crystal photo-alignment agent of claim 1, wherein the functional diamine comprises a diamine represented by one or more of the following Formulae 15 to 18:

[Chemical Formula 15]

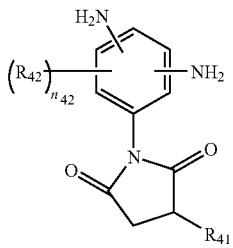

wherein, in the above Formula 15, $R_{41}$ is hydrogen, substituted or unsubstituted C1 to C20 alkyl, substituted or unsubstituted C6 to C30 aryl, or substituted or unsubstituted C2 to C30 heteroaryl, $R_{42}$ is substituted or unsubstituted C1 to C20 alkyl, substituted or unsubstituted C6 to C30 aryl, or substituted or unsubstituted C2 to C30 heteroaryl, $n_{42}$ is an integer ranging from 0 to 3, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 16]

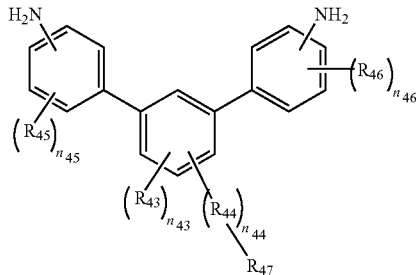

wherein, in the above Formula 16, $R_{43}$, $R_{45}$, and $R_{46}$ are each independently substituted or unsubstituted C1 to C20 alkyl, substituted or unsubstituted C6 to C30 aryl, or substituted or unsubstituted C2 to C30 heteroaryl, $R_{44}$ is —O—, —COO—, —CONH—, —OCO—, or substituted or unsubstituted C1 to C10 alkylene, $R_{47}$ is hydrogen; substituted or unsubstituted C1 to C20 alkyl; substituted or unsubstituted C6 to C30 aryl; or substituted or unsubstituted C2 to C30 heteroaryl; or alkyl, aryl, or heteroaryl including —O—, —COO—, —CONH—, —OCO—, or a combination thereof, $n_{43}$ is an integer of 0 or 3, $n_{45}$ and $n_{46}$ are each independently integers ranging from 0 to 4, $n_{44}$ is an integer of 0 or 1, and wherein each of said substituted C1 to C20 alkyl, substituted C6 to C30 aryl, substituted C2 to C30 heteroaryl, or substituted or unsubstituted C1 to C10 alkylene independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 17]

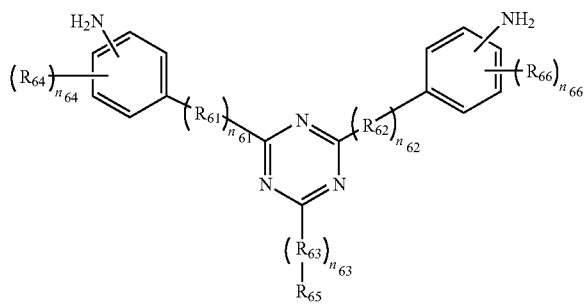

wherein, in the above Formula 17, $R_{64}$ and $R_{66}$ are each independently substituted or unsubstituted C1 to C20 alkyl, substituted or unsubstituted C6 to C30 aryl, or substituted or unsubstituted C2 to C30 heteroaryl, $R_{65}$ is hydrogen, substituted or unsubstituted C1 to C20 alkyl, substituted or unsubstituted C6 to C30 aryl, or substituted or unsubstituted C2 to C30 heteroaryl, $R_{61}$ and $R_{62}$ are each independently —O— or —COO—, $R_{63}$ is —O—, —COO—, —CONH—, or —OCO—, $n_{64}$ and $n_{66}$ are each independently integers ranging from 0 to 4, $n_{61}$ to $n_{63}$ are each independently integers of 0 or 1, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 18]

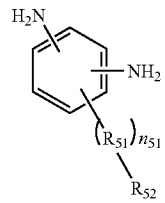

wherein, in the above Formula 18, $R_{51}$ is a single bond, —O—, —COO—, —OCO—, —NHCO—, or —CONH—, and $n_{51}$ is an integer ranging from 0 to 2, $R_{52}$ is substituted or unsubstituted C1 to C20 alkyl; substituted or unsubstituted C6 to C30 aryl; substituted or unsubstituted C2 to C30 heteroaryl; or alkyl, aryl, or heteroaryl including —O—, —COO—, —CONH—, —OCO— or a combination thereof, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof.

9. The liquid crystal photo-alignment agent of claim 1, wherein the cinnamate-based photodiamine comprises a compound of the following Formulae 19 and 20, or a combination thereof:

[Chemical Formula 19]

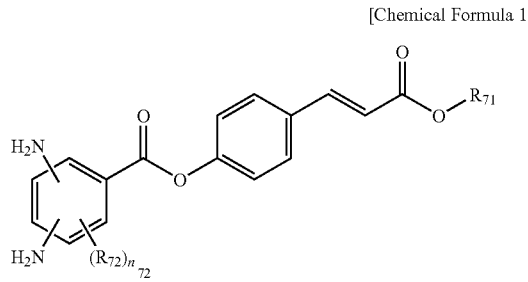

wherein, in the above Formula 19, $R_{71}$ is hydrogen, substituted or unsubstituted C1 to C30 alkyl, substituted or unsubstituted C6 to C30 aryl, or substituted or unsubstituted C2 to C30 heteroaryl, $R_{72}$ is substituted or unsubstituted C1 to C30 alkyl, substituted or unsubstituted C6 to C30 aryl, or substituted or unsubstituted C2 to C30 heteroaryl, $n_{72}$ is an integer ranging from 0 to 3, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 20]

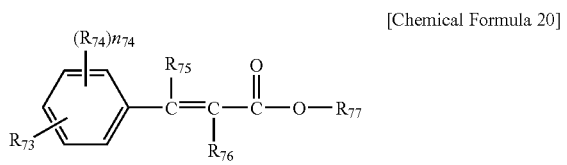

wherein, in the above Formula 20, $R_{77}$ is aromatic diamine, diamine including substituted or unsubstituted linear or branched C1 to C24 alkylene, or a combination thereof, wherein the substituted alkylene of $R_{77}$ is substituted alkylene comprising at least one hydrogen substituted with halogen or cyano; substituted alkylene comprising at least one $CH_2$ substituted with substituted or unsubstituted C6 to C30 arylene, substituted or unsubstituted C2 to C30 heteroarylene, substituted or unsubstituted C3 to C30 cycloalkylene, substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —CH═CH—, —C≡C—, or —O—CO—O—, wherein R' is hydrogen or substituted or unsubstituted C1 to C6 alkyl and wherein adjacent $CH_2$ groups are not so substituted; or a combination thereof, $R_{74}$ is substituted or unsubstituted C1 to C20 alkyl, substituted or unsubstituted C6 to C30 aryl, or substituted or unsubstituted C2 to C30 heteroaryl, $n_{74}$ is an integer ranging from 0 to 4

$R_{75}$ and $R_{76}$ are each independently hydrogen, halogen, cyano, or substituted or unsubstituted C1 to C12 alkyl, wherein the substituted alkyls of $R_{75}$ and $R_{76}$ are each independently substituted alkyl comprising at least one hydrogen substituted with halogen or cyano; substituted alkyl comprising at least one $CH_2$ group substituted with —O—, —CO—O—, —O—CO—, or —CH═CH—, wherein adjacent $CH_2$ groups are not so substituted; or a combination thereof, $R_{73}$ is substituted or unsubstituted C1 to C30 alkyl, substituted or unsubstituted C7 to C30 alkylaryl, substituted or unsubstituted C3 to C30 cycloalkyl, substituted or unsubstituted pyrimidinyl, substituted or unsubstituted pyridinyl, substituted or unsubstituted thiophenyl, substituted or unsubstituted furanyl, substituted or unsubstituted naphthyl, or substituted or unsubstituted phenyl, wherein the substituted alkyl of $R_{73}$ is substituted alkyl comprising at least one hydrogen substituted with halogen or cyano; substituted alkyl comprising at least one $CH_2$ group substituted with —O—, —CO—O—, —O—CO—, or —CH═CH—, wherein adjacent $CH_2$ groups are not so substituted; or a combination thereof, wherein the substituted alkylaryl of $R_{73}$ is substituted alkylaryl comprising at least one $CH_2$ group substituted with —O—, —CO—O—, —O—CO—, or —CH═CH—, wherein adjacent $CH_2$ groups are not so substituted, or a combination thereof, and wherein each of said substituted C1 to C20 alkyl, substituted C6 to C30 aryl, substituted C2 to C30 heteroaryl, substituted C6 to C30 arylene, substituted C2 to C30 heteroarylene, substituted C3 to C30 cycloalkylene, substituted C2 to C30 heterocycloalkylene, substituted C3 to C30 cycloalkyl, substituted pyrimidinyl, substituted pyridinyl, substituted thiophenyl, substituted furanyl, substituted naphthyl, or substituted phenyl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof.

10. The liquid crystal photo-alignment agent of claim 1, wherein the chalcone-based photodiamine comprises a compound of the following Formula 21:

[Chemical Formula 21]

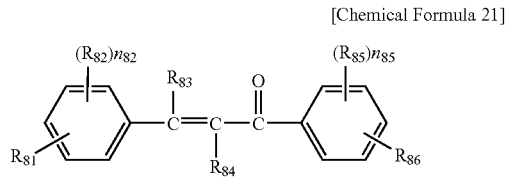

wherein, in the above Formula 21, $R_{81}$ is aromatic diamine, diamine including a substituted or unsubstituted linear or branched C1 to C24 alkylene, or a combination thereof, wherein the substituted alkylene of $R_{81}$ is substituted alkylene comprising at least one hydrogen substituted with halogen or cyano; substituted alkylene comprising at least one $CH_2$ group substituted with substituted or unsubstituted C6 to C30 arylene, substituted or unsubstituted C2 to C30 heteroarylene, substituted or unsubstituted C3 to C30 cycloalkylene, substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —CH═CH—, —C≡C— or —O—CO—O—, wherein R' is hydrogen or substituted or unsubstituted C1 to C6 alkyl and wherein adjacent CH$_2$ groups are not so substituted; or a combination thereof, R$_{82}$ and R$_{85}$ are each independently substituted or unsubstituted C1 to C20 alkyl, substituted or unsubstituted C6 to C30 aryl, or substituted or unsubstituted C2 to C30 heteroaryl, n$_{82}$ and n$_{85}$ are each integers ranging from 0 to 4, R$_{83}$ and R$_{84}$ are each independently hydrogen, halogen, cyano, or substituted or unsubstituted C1 to C12 alkyl, wherein the substituted alkyls of R$_{83}$ and R$_{84}$ are each independently substituted alkyl comprising at least one hydrogen substituted with halogen or cyano; substituted alkyl comprising at least one CH$_2$ group substituted with —O—, —CO—O—, —O—CO—, or —CH═CH—, wherein adjacent CH$_2$ groups are not so substituted; or a combination thereof, R$_{86}$ is substituted or unsubstituted C1 to C30 alkyl, substituted or unsubstituted C7 to C30 alkylaryl, substituted or unsubstituted C3 to C30 cycloalkyl, substituted or unsubstituted pyrimidinyl, substituted or unsubstituted pyridinyl, substituted or unsubstituted thiophenyl, substituted or unsubstituted furanyl, substituted or unsubstituted naphthyl, or substituted or unsubstituted phenyl, wherein the substituted alkyl of R$_{86}$ is substituted alkyl comprising at least one hydrogen substituted with halogen or cyano; substituted alkyl comprising at least one CH$_2$ group substituted with —O—, —CO—O—, —O—CO—, or —CH═CH—, wherein adjacent CH$_2$ groups are not so substituted; or a combination thereof, wherein the substituted alkylaryl of R$_{86}$ is substituted alkylaryl comprising at least one CH$_2$ group substituted —O—, —CO—O—, —O—CO—, or —CH═CH—, wherein adjacent CH$_2$ groups are not so substituted, or a combination thereof, and wherein each of said substituted C1 to C20 alkyl, substituted C6 to C30 aryl, substituted C2 to C30 heteroaryl, substituted C6 to C30 arylene, substituted C2 to C30 heteroarylene, substituted C3 to C30 cycloalkylene, substituted C2 to C30 heterocycloalkylene, substituted C3 to C30 cycloalkyl, substituted pyrimidinyl, substituted pyridinyl, substituted thiophenyl, substituted furanyl, substituted naphthyl, or substituted phenyl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof.

11. The liquid crystal photo-alignment agent of claim 1, wherein the coumarin-based photodiamine comprises a compound of the following Formula 22:

[Chemical Formula 22]

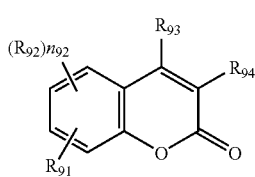

wherein, in the above Formula 22,

R$_{91}$ is aromatic diamine, diamine including a substituted or unsubstituted linear or branched C1 to C24 alkylene, or a combination thereof, wherein the substituted alkylene of R$_{91}$ is substituted alkylene comprising at least one hydrogen substituted with halogen or cyano; substituted alkylene comprising at least one CH$_2$ group substituted with substituted or unsubstituted C6 to C30 arylene, substituted or unsubstituted C2 to C30 heteroarylene, substituted or unsubstituted C3 to C30 cycloalkylene, substituted or unsubstituted C2 to C30 heterocycloalkylene, —O—, —CO—, —CO—O—, —O—CO—, —Si(CH$_3$)$_2$—O—Si(CH$_3$)$_2$—, —NR'—, —NR'—CO—, —CO—NR'—, —NR'—CO—O—, —O—CO—NR'—, —CH═CH—, —C≡C—, or —O—CO—O—, wherein R' is hydrogen or substituted or unsubstituted C1 to C6 alkyl and wherein adjacent CH$_2$ groups are not so substituted; or a combination thereof, R$_{92}$ is substituted or unsubstituted C1 to C20 alkyl, substituted or unsubstituted C6 to C30 aryl, or substituted or unsubstituted C2 to C30 heteroaryl, n$_{92}$ is an integer ranging from 0 to 4, R$_{93}$ and R$_{94}$ are each independently hydrogen, halogen, cyano, or substituted or unsubstituted C1 to C12 alkyl, wherein the substituted alkyls of R$_{93}$ and R$_{94}$ are each independently substituted alkyl comprising at least one hydrogen substituted halogen or cyano; substituted alkyl comprising at least one CH$_2$ group substituted with —O—, —CO—O—, —O—CO—, or —CH═CH—, wherein adjacent CH$_2$ groups are not so substituted; or a combination thereof, and wherein each of said substituted C1 to C20 alkyl, substituted C6 to C30 aryl, substituted C2 to C30 heteroaryl, substituted C6 to C30 arylene, substituted C2 to C30 heteroarylene, substituted C3 to C30 cycloalkylene, substituted C2 to C30 heterocycloalkylene, substituted C3 to C30 cycloalkyl, substituted pyrimidinyl, substituted pyridinyl, substituted thiophenyl, substituted furanyl, substituted naphthyl, or substituted phenyl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof.

12. The liquid crystal photo-alignment agent of claim 1, wherein the R$_2$ and R$_4$, or R$_6$ and R$_8$ is present at a mole ratio of about 1 to 90:1 to 70.

13. The liquid crystal photo-alignment agent of claim 8, wherein the functional diamine and aromatic diamine excluding the functional diamine are present at a mole ratio of about 1 to 50:1 to 90.

14. The liquid crystal photo-alignment agent of claim 1, wherein the functional diamine comprises a diamine represented by one or more of the following Formulae 24 and 26-28:

[Chemical Formula 24]

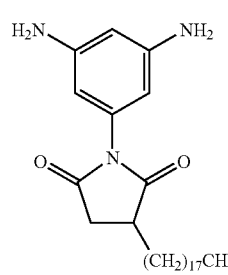

-continued
[Chemical Formula 26]
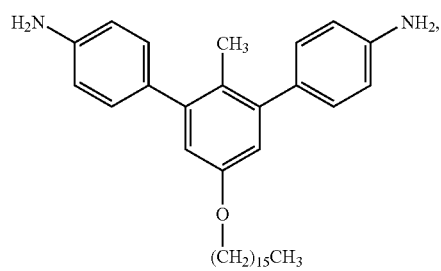
[Chemical Formula 27]
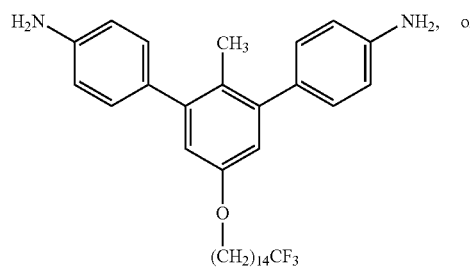
[Chemical Formula 28]
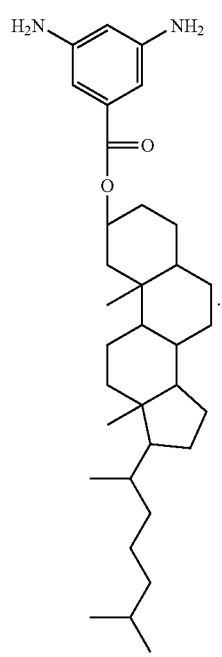
15. The liquid crystal photo-alignment agent of claim 1, wherein the photodiamine comprises a photoreactive diamine represented by one or more of the following Formulae 25 and 29-31:
[Chemical Formula 25]
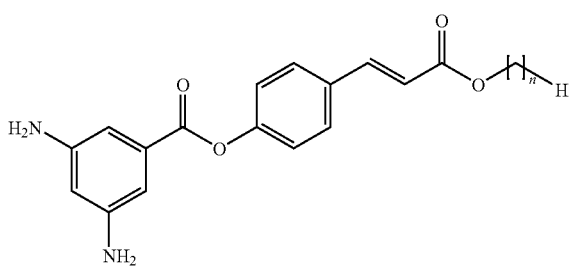
wherein n=2,
[Chemical Formula 29]
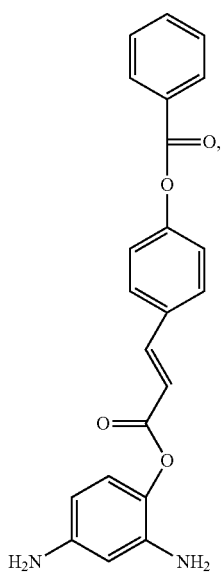
[Chemical Formula 30]
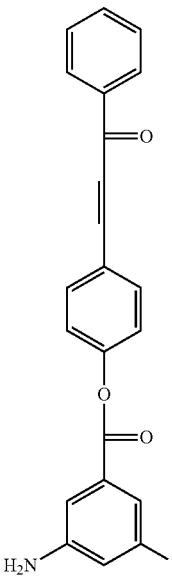

[Chemical Formula 31]

16. The liquid crystal photo-alignment agent of claim 1, wherein said liquid crystal photo-alignment agent has a voltage holding ratio of more than about 99% and low residual DC of less than about 200.

17. A composition useful for the production of a liquid crystal photo-alignment film comprising a liquid crystal photo-alignment agent according to claim 1 and a solvent.

18. The composition of claim 17, wherein the liquid crystal photo-alignment agent comprises a functional diamine represented by one or more of the following Formaulae 15 to 18:

[Chemical Formula 15]

wherein, in the above Formula 15,
$R_{41}$ is hydrogen, substituted or unsubstituted C1 to C20 alkyl, substituted or unsubstituted C6 to C30 aryl, or substituted or unsubstituted C2 to C30 heteroaryl,
$R_{42}$ is substituted or unsubstituted C1 to C20 alkyl, substituted or unsubstituted C6 to C30 aryl, or substituted or unsubstituted C2 to C30 heteroaryl,
$n_{42}$ is an integer ranging from 0 to 3, and
wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 16]

wherein, in the above Formula 16,
$R_{43}$, $R_{45}$, and $R_{46}$ are each independently substituted or unsubstituted C1 to C20 alkyl, substituted or unsubstituted C6 to C30 aryl, or substituted or unsubstituted C2 to C30 heteroaryl,
$R_{44}$ is —O—, —COO—, —CONH—, —OCO—, or substituted or unsubstituted C1 to C10 alkylene,
$R_{47}$ is hydrogen; substituted or unsubstituted C1 to C20 alkyl; substituted or unsubstituted C6 to C30 aryl; or substituted or unsubstituted C2 to C30 heteroaryl; or alkyl, aryl, or heteroaryl including —O—, —COO—, —CONH—, —OCO—, or a combination thereof,
$n_{43}$ is an integer of 0 or 3,
$n_{45}$ and $n_{46}$ are each independently integers ranging from 0 to 4,
$n_{44}$ is an integer of 0 or 1, and
wherein each of said substituted C1 to C20 alkyl, substituted C6 to C30 aryl, substituted C2 to C30 heteroaryl, or substituted or unsubstituted C1 to C10 alkylene independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 17]

wherein, in the above Formula 17,
$R_{64}$ and $R_{66}$ are each independently substituted or unsubstituted C1 to C20 alkyl, substituted or unsubstituted C6 to C30 aryl, or substituted or unsubstituted C2 to C30 heteroaryl,
$R_{65}$ is hydrogen, substituted or unsubstituted C1 to C20 alkyl, substituted or unsubstituted C6 to C30 aryl, or substituted or unsubstituted C2 to C30 heteroaryl,
$R_{61}$ and $R_{62}$ are each independently —O— or —COO—,
$R_{63}$ is —O—, —COO—, —CONH—, or —OCO—,
$n_{64}$ and $n_{66}$ are each independently integers ranging from 0 to 4,
$n_{61}$ to $n_{63}$ are each independently integers of 0 or 1, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 18]

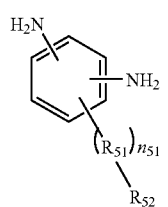

wherein, in the above Formula 18,
$R_{51}$ is a single bond, —O—, —COO—, —OCO—, —NHCO—, or —CONH—, and $n_{51}$ is an integer ranging from 0 to 2,
$R_{52}$ is substituted or unsubstituted C1 to C20 alkyl; substituted or unsubstituted C6 to C30 aryl; substituted or unsubstituted C2 to C30 heteroaryl; or alkyl, aryl, or heteroaryl including —O—, —COO—, —CONH—, —OCO— or a combination thereof, and
wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C 1 to C20 alkoxy, or a combination thereof.

19. A liquid crystal photo-alignment film comprising a liquid crystal photo-alignment agent according to claim 1 disposed on a substrate.

20. The liquid crystal photo-alignment film of claim 19, wherein the liquid crystal photo-alignment agent comprises a functional diamine represented by one or more of the following Formulae 15 to 18:

[Chemical Formula 15]

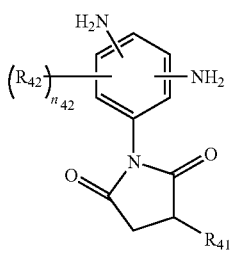

wherein, in the above Formula 15,
$R_{41}$ is hydrogen, substituted or unsubstituted C1 to C20 alkyl, substituted or unsubstituted C6 to C30 aryl, or substituted or unsubstituted C2 to C30 heteroaryl,
$R_{42}$ is substituted or unsubstituted C1 to C20 alkyl, substituted or unsubstituted C6 to C30 aryl, or substituted or unsubstituted C2 to C30 heteroaryl,
$n_{42}$ is an integer ranging from 0 to 3, and
wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 16]

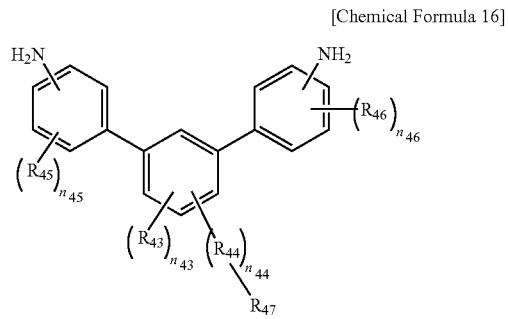

wherein, in the above Formula 16,
$R_{43}$, $R_{45}$ and $R_{46}$ are each independently substituted or unsubstituted C1 to C20 alkyl, substituted or unsubstituted C6 to C30 aryl, or substituted or unsubstituted C2 to C30 heteroaryl,
$R_{44}$ is —O—, —COO—, —CONH—, —OCO—, or substituted or unsubstituted C1 to C10 alkylene,
$R_{47}$ is hydrogen; substituted or unsubstituted C1 to C20 alkyl; substituted or unsubstituted C6 to C30 aryl; or substituted or unsubstituted C2 to C30 heteroaryl; or alkyl, aryl, or heteroaryl including —O—, —COO—, —CONH—, —OCO—, or a combination thereof,
$n_{43}$ is an integer of 0 or 3,
$n_{45}$ and $n_{46}$ are each independently integers ranging from 0 to 4,
$n_{44}$ is an integer of 0 or 1, and
wherein each of said substituted C1 to C20 alkyl, substituted C6 to C30 aryl, substituted C2 to C30 heteroaryl, or substituted or unsubstituted C1 to C10 alkylene independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 17]

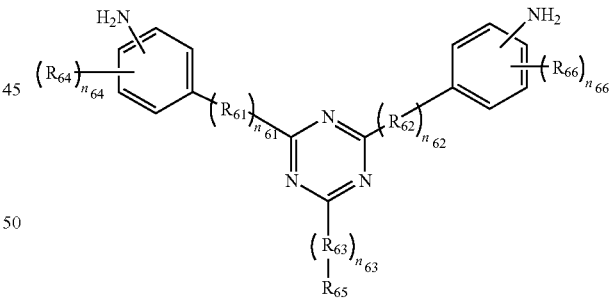

wherein, in the above Formula 17,
$R_{64}$ and $R_{66}$ are each independently substituted or unsubstituted C1 to C20 alkyl, substituted or unsubstituted C6 to C30 aryl, or substituted or unsubstituted C2 to C30 heteroaryl,
$R_{65}$ is hydrogen, substituted or unsubstituted C1 to C20 alkyl, substituted or unsubstituted C6 to C30 aryl, or substituted or unsubstituted C2 to C30 heteroaryl,
$R_{61}$ and $R_{62}$ are each independently —O— or —COO—,
$R_{63}$ is —O—, —COO—, —CONH—, or —OCO—,
$n_{64}$ and $n_{66}$ are each independently integers ranging from 0 to 4,
$n_{61}$ to $n_{63}$ are each independently integers of 0 or 1, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 18]

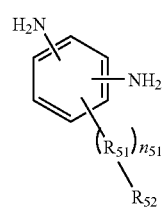

wherein, in the above Formula 18, $R_{51}$ is a single bond, —O—, —COO—, —OCO—, —NHCO—, or —CONN—, and $n_{51}$ is an integer ranging from 0 to 2, $R_{52}$ is substituted or unsubstituted C1 to C20 alkyl; substituted or unsubstituted C6 to C30 aryl; substituted or unsubstituted C2 to C30 heteroaryl; or alkyl, aryl, or heteroaryl including —O—, —COO—, —CONH—, —OCO— or a combination thereof, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof.

21. A liquid crystal display (LCD) comprising the liquid crystal photo-alignment film according to claim 19.

22. A liquid crystal photo-alignment agent, comprising a polyamic acid copolymer including a repeating unit having the following Formula 1 and a repeating unit having the following Formula 2, a polyimide copolymer including a repeating unit having the following Formula 3 and a repeating unit having the following Formula 4, or a combination thereof:

[Chemical Formula 1]

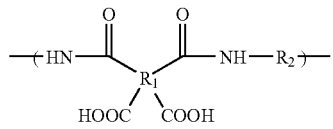

[Chemical Formula 2]

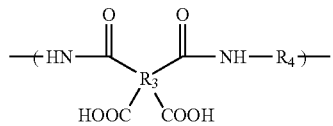

[Chemical Formula 3]

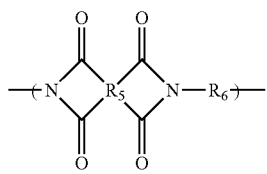

[Chemical Formula 4]

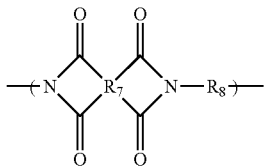

wherein, in the above Formulae 1 to 4, $R_1$, $R_3$, $R_5$, and $R_7$ are each independently a quadrivalent organic group derived from an acid dianhydride comprising an aliphatic cyclic acid dianhydride or an aromatic acid dianhydride, $R_2$ and $R_6$ are each independently divalent organic groups derived from an aromatic diamine, wherein the aromatic diamine comprises a functional diamine represented by one or more of the following Formulae 15 to 18:

[Chemical Formula 15]

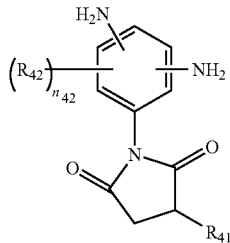

wherein, in the above Formula 15, $R_{41}$ is hydrogen, substituted or unsubstituted C1 to C20 alkyl, substituted or unsubstituted C6 to C30 aryl, or substituted or unsubstituted C2 to C30 heteroaryl, $R_{42}$ is substituted or unsubstituted C1 to C20 alkyl, substituted or unsubstituted C6 to C30 aryl, or substituted or unsubstituted C2 to C30 heteroaryl, $n_{42}$ is an integer ranging from 0 to 3, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 16]

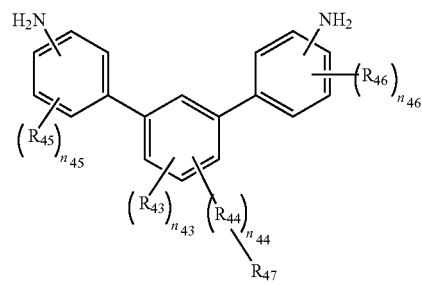

wherein, in the above Formula 16, $R_{43}$, $R_{45}$, and $R_{46}$ are each independently substituted or unsubstituted C1 to C20 alkyl, substituted or unsubstituted C6 to C30 aryl, or substituted or unsubstituted C2 to C30 heteroaryl, $R_{44}$ is —O—, —COO—, —CONH—, —OCO—, or substituted or unsubstituted C1 to C10 alkylene, $R_{47}$ is hydrogen; substituted or unsubstituted C1 to C20 alkyl; substituted or unsubstituted C6 to C30 aryl; or substituted or unsubstituted C2 to C30 heteroaryl; or alkyl, aryl, or heteroaryl including —O—, —COO—, —CONH—, —OCO—, or a combination thereof, $n_{43}$ is an integer of 0 or 3, $n_{45}$ and $n_{46}$ are each independently integers ranging from 0 to 4, $n_{44}$ is an integer of 0 or 1, and wherein each of said substituted C1 to C20 alkyl, substituted C6 to C30 aryl, substituted C2 to C30 heteroaryl, or substituted or unsubstituted C1 to C10 alkylene independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 17]

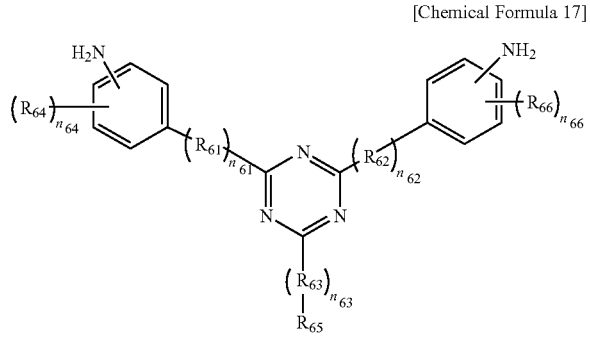

wherein, in the above Formula 17, $R_{64}$ and $R_{66}$ are each independently substituted or unsubstituted C1 to C20 alkyl, substituted or unsubstituted C6 to C30 aryl, or substituted or unsubstituted C2 to C30 heteroaryl, $R_{65}$ is hydrogen, substituted or unsubstituted C1 to C20 alkyl, substituted or unsubstituted C6 to C30 aryl, or substituted or unsubstituted C2 to C30 heteroaryl, $R_{61}$ and $R_{62}$ are each independently —O— or —COO—, $R_{63}$ is —O—, —COO—, —CONH—, or —OCO—, $n_{64}$ and $n_{66}$ are each independently integers ranging from 0 to 4, $n_{61}$ to $n_{63}$ are each independently integers of 0 or 1, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof;

[Chemical Formula 18]

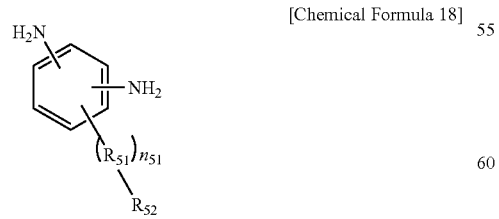

wherein, in the above Formula 18, $R_{51}$ is a single bond, —O—, —COO—, —OCO—, —NHCO—, or —CONH—, and $n_{51}$ is an integer ranging from 0 to 2, $R_{52}$ is substituted or unsubstituted C1 to C20 alkyl; substituted or unsubstituted C6 to C30 aryl; substituted or unsubstituted C2 to C30 heteroaryl; or alkyl, aryl, or heteroaryl including —O—, —COO—, —CONH—, —OCO— or a combination thereof, and wherein each of said substituted C1 to C20 alkyl, substituted C6 to C30 aryl, or substituted C2 to C30 heteroaryl independently comprises at least one substituent selected from halogen, C1 to C30 alkyl, C1 to C30 haloalkyl, C6 to C30 aryl, C2 to C30 heteroaryl, C1 to C20 alkoxy, or a combination thereof; and $R_4$ and $R_8$ are each independently divalent organic groups derived from a photodiamine comprising a coumarin-based photodiamine, chalcone-based photodiamine, or cinnamate-based photodiamine, wherein the functional diamine and aromatic diamine excluding the functional diamine are present at a mole ratio of about 1 to 50:1 to 90.

23. A liquid crystal photo-alignment agent, comprising a polyamic acid copolymer including a repeating unit having the following Formula 1 and a repeating unit having the following Formula 2, a polyimide copolymer including a repeating unit having the following Formula 3 and a repeating unit having the following Formula 4, or a combination thereof:

[Chemical Formula 1]

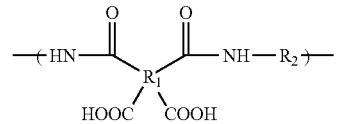

[Chemical Formula 2]

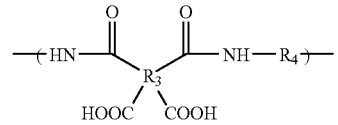

[Chemical Formula 3]

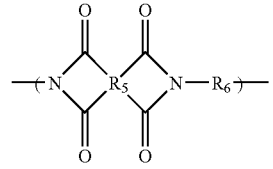

[Chemical Formula 4]

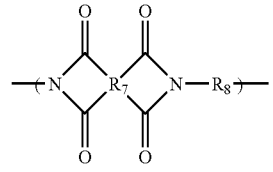

wherein, in the above Formulae 1 to 4, $R_1$, $R_3$, $R_5$, and $R_7$ are each independently a quadrivalent organic group derived from an acid dianhydride comprising an aliphatic cyclic acid dianhydride or an aromatic acid dianhydride, $R_2$ and $R_6$ are each independently divalent organic groups derived from an aromatic diamine, wherein the aromatic diamine comprises a functional diamine represented by one or more of the following Formulae 24 and 26-28:

[Chemical Formula 24]
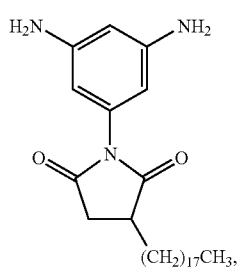
[Chemical Formula 26]
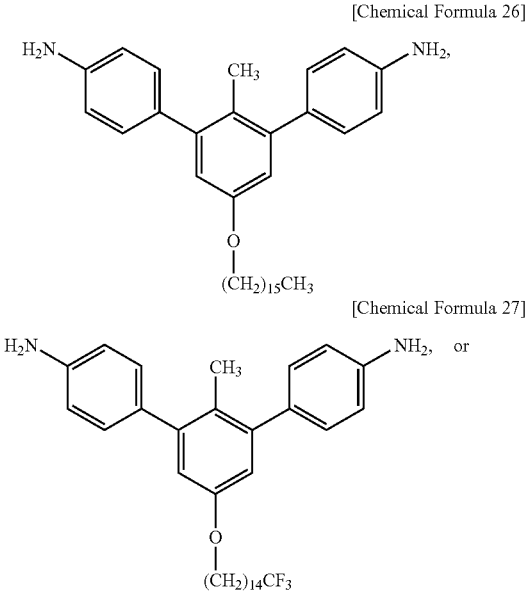
[Chemical Formula 27]
[Chemical Formula 28]
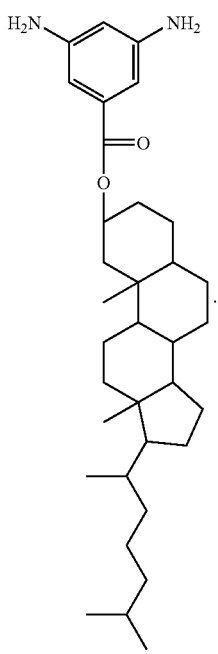
and
$R_4$ and $R_8$ are each independently divalent organic groups derived from a photodiamine comprising a coumarin-based photodiamine, chalcone-based photodiamine, or cinnamate-based photodiamine.
* * * * *

UNITED STATES PATENT AND TRADEMARK OFFICE
CERTIFICATE OF CORRECTION

Page 1 of 1

PATENT NO. : 8,057,700 B2
APPLICATION NO. : 12/329139
DATED : November 15, 2011
INVENTOR(S) : Jae-Min Oh et al.

It is certified that error appears in the above-identified patent and that said Letters Patent is hereby corrected as shown below:

Claim 7, Column 30, Line 29 reads "wherein $R_2$ and $R_6$ ~~are~~ each independently divalent organic"
and should read "$R_2$ and $R_6$ each independently <u>comprise</u> divalent organic"

Claim 20, Column 43, Line 21 reads "-NHCO-, or ~~-CONN-~~, and $n_{51}$ is an integer rang-"
and should read "-NHCO-, or -<u>CONH</u>-, and $n_{51}$ is an integer rang-"

Signed and Sealed this
First Day of May, 2012

David J. Kappos
*Director of the United States Patent and Trademark Office*